(12) United States Patent
Talon et al.

(10) Patent No.: US 11,944,231 B2
(45) Date of Patent: Apr. 2, 2024

(54) SYSTEM FOR MULTI-INGREDIENT BEVERAGE PREPARATION FROM VARIOUS CONTAINER TYPES

(71) Applicant: SOCIETE DES PRODUITS NESTLE S.A., Vevey (CH)

(72) Inventors: Christian Talon, Vufflens-le-Chateau (CH); Christophe Sebastien Paul Heydel, Chez-le-Bart (CH); Christian Jarisch, Lutry (CH); Andre Noth, Pully (CH); Enzo Bonacci, Savigny (CH); Jean-Luc Denisart, Cully (CH); Alfred Yoakim, St-Legier-la Chiesaz (CH)

(73) Assignee: Societe des Produits Nestle S.A., Vevey (CH)

( * ) Notice: Subject to any disclaimer, the term of this patent is extended or adjusted under 35 U.S.C. 154(b) by 556 days.

(21) Appl. No.: 16/763,785

(22) PCT Filed: Nov. 14, 2018

(86) PCT No.: PCT/EP2018/081200
§ 371 (c)(1),
(2) Date: May 13, 2020

(87) PCT Pub. No.: WO2019/096830
PCT Pub. Date: May 23, 2019

(65) Prior Publication Data
US 2020/0352386 A1   Nov. 12, 2020

(30) Foreign Application Priority Data
Nov. 15, 2017   (EP) ..................................... 17201864

(51) Int. Cl.
*A47J 31/36* (2006.01)
*A47J 31/40* (2006.01)
(Continued)

(52) U.S. Cl.
CPC ....... *A47J 31/3676* (2013.01); *A47J 31/3623* (2013.01); *A47J 31/407* (2013.01); *A47J 31/469* (2018.08)

(58) Field of Classification Search
None
See application file for complete search history.

(56) References Cited

U.S. PATENT DOCUMENTS

2005/0223904 A1* 10/2005 Laigneau ............ A47J 31/3695
206/0.5
2006/0266222 A1* 11/2006 Hammad ............ A47J 31/4467
99/279
(Continued)

FOREIGN PATENT DOCUMENTS

CN   101485542 A   7/2009
CN   103781388 A   5/2014
(Continued)

OTHER PUBLICATIONS

Chinese Office Action for Patent Application No. 201880072104 dated Sep. 24, 2021.
(Continued)

*Primary Examiner* — John J Norton
(74) *Attorney, Agent, or Firm* — K&L Gates LLP

(57) ABSTRACT

The invention concerns a beverage preparation machine (1) comprising a fluid system comprising a fluid source (2), a pump (3), a heating element (4), at least two container holders (7a, 7b) adapted for receiving ingredient containers (11, 17), a control unit (8) for controlling the fluid system to prepare a beverage by mixing fluid with the beverage ingredient contained in the containers to produce a mixed beverage component in each of the containers, wherein the control unit is further arranged to dispense part or whole of the mixed components sequentially or simultaneously to produce the beverage, wherein the container holders (7a, 7b)

(Continued)

differ from one another for holding containers of different sizes and/or types and, and wherein it further comprises separate fluid injection interfaces (9a, 9b) having different structural and kinematic configurations, and arranged for independently delivering fluid in one of the corresponding ingredient containers; each interface being connected to the fluid system and being adapted to a different container.

15 Claims, 18 Drawing Sheets

(51) Int. Cl.
  *A47J 31/41* (2006.01)
  *A47J 31/46* (2006.01)

(56) References Cited

U.S. PATENT DOCUMENTS

| | | | |
|---|---|---|---|
| 2007/0068394 A1* | 3/2007 | Jarisch | A47J 31/3633 99/279 |
| 2007/0175335 A1* | 8/2007 | Liverani | A47J 31/3695 99/279 |
| 2008/0000357 A1* | 1/2008 | Yang | A47J 31/0684 99/279 |
| 2008/0121111 A1* | 5/2008 | Paget | A47J 31/3638 99/295 |
| 2010/0162898 A1 | 7/2010 | Mahlich | |
| 2010/0269706 A1 | 10/2010 | Denisart et al. | |
| 2014/0338541 A1* | 11/2014 | Jaccard | A47J 31/36 99/291 |
| 2015/0050404 A1* | 2/2015 | Ferrier | A47J 31/36 99/295 |

FOREIGN PATENT DOCUMENTS

| | | |
|---|---|---|
| CN | 106715322 A | 5/2017 |
| DE | 202007002910 | 5/2007 |
| FR | 2842090 | 1/2004 |
| WO | 2012162588 A1 | 11/2012 |
| WO | 2015132320 | 9/2015 |

OTHER PUBLICATIONS

Japanese Office Action for Appl No. 2020-524474 dated Jun. 13, 2023.

\* cited by examiner

SYSTEM FOR MULTI-INGREDIENT BEVERAGE PREPARATION FROM VARIOUS CONTAINER TYPES

CROSS REFERENCE TO RELATED APPLICATIONS

The present application is a National Stage of International Application No. PCT/EP2018/081200, filed on Nov. 14, 2018, which claims priority to European Patent Application No. 17201864.0, filed on Nov. 15, 2017, the entire contents of which are being incorporated herein by reference.

FIELD OF THE INVENTION

The present invention concerns a system for beverage preparation from various portioned ingredients, said system comprising a machine and one or more ingredient package (s).

BACKGROUND OF THE INVENTION

Beverage preparation systems for portioned beverage are well known in the art. They are also widely available commercially. They comprise usually a machine into which one or more ingredient containers are inserted. The machine is able to pass a fluid, typically hot water through an ingredient contained in the container, so as to produce a beverage by dissolution (from e.g. milk or chocolate soluble powders), low-pressure infusion (from e.g. leaf tea, loose coffee powder), or high-pressure extraction (from e.g. roast and ground coffee in loose or compacted form). The machine comprises one fluid system with fluid-conducting pipes, a fluid-conducting pump, a fluid source (e.g. a water tank, or a direct plumbing connection valve), and a so-called brewing chamber which is adapted to accommodate said ingredient container and prepare a beverage by mixing said ingredient and said fluid according to the methods described above.

In order to produce more varieties of beverages with one single system, a certain number of systems have been proposed, as follows.

US 2010/0162898 is a US patent application to Mahlich, assigned to Eugster Frismag AG, and published Jul. 1 2010. It discloses a machine for preparing beverages and comprising a combination of a first coffee brewing unit able to adapt loose coffee powder or a portion of coffee or cocoa, together with a second docking device for plugging a multi-portion container for milk powder. Mahlich describes that multi-ingredient beverages (e.g. cappuccinos) can be prepared thereof, by extracting coffee in the brewing unit by passing hot water under pressure through the coffee, and then reconstituting milk from the powder that falls from the multi-portion container into a conveying track that conveys said powder into a milk frother wherein said powder is mixed with water and steam (no injection of water is made directly into the milk powder container).

In this document, the machine is complex as it requires a milk powder doser and conveyor to convey the milk powder that falls from the multi-portion container by gravity, towards an additional unit wherein the milk powder is mixed to water. This requires a bulky machine (the multi-portion milk container has a great volume) and its complexity (doser, conveyor, milk frother) is an additional element which make the whole machine expensive, complex to maintain, and difficult to handle for the user. Furthermore, the milk component cannot be dispensed directly to the end-user (direct flow to the cup), because the ingredient is prepared in a mixing chamber. This requires a lot of cleaning of structural parts of the machine (at least the mixing chamber itself, as well as the product dispensing pipes that convey the reconstituted milk from the mixing chamber to the cup of the end-user), in order to avoid development of bacteria in such a biological medium as milk.

A similar disclosure is provided in US 2002/0145010 A1, a US patent application to Ufheil, assigned to Nestle and published Oct. 10, 2002.

EP 125215 B1 is a European patent to Tuttoespresso S. R. L., published Sep. 7, 1988. It describes a manually operated hot drink dispenser machine using single-use ingredient cartridges. It comprises a first chamber for housing a cylindrical small-sized cartridge for percolation of a drink and a second cylindrical chamber communicating with said first chamber to form a bicylindrical chamber for housing a bicylindrical large-sized cartridge for a solution or suspension drink.

The machine is further provided with a plurality of fluid-supply central openings for supplying water at high temperature, and a peripheral opening for supplying water at low temperature. The peripheral opening for low temperature water supply is separated from the central openings for supply of water at high temperature.

Being so constructed, the Tuttoespresso machine passes only water at high temperature through the small size cartridge, and water at both high and low temperatures through the large sized cartridge. This allows to adapt the temperature of beverage preparation, depending on the type of beverage ingredient.

This machine has the advantage that it allows to prepare beverages from various container sizes, specifically adapted to each type of ingredient, in order to avoid large headspace in mono-format containers that would not require the same amount of ingredient for all beverage types. However, this machine has a major drawback: it is adapted only for manual and sequential preparation of multi-ingredient beverages. Furthermore, the ingredient containers inserted therein can have various heights, and various shapes in their lower portion, however they require to all share a common shape and diameter in their upper part, in order to adapt to the upper part of the brewing chamber. With such a configuration and constraints, it is impossible with this machine to prepare multi-ingredient beverages in a user-friendly way, such as an automated manner that would require only one press of a button by the user. For such multi-ingredient beverages preparation, the Tuttoespresso machine described above requires the user to insert sequentially one ingredient cartridge, actuate the machine, then remove the first cartridge and insert a second one, then actuate the machine again. This is fastidious, hence, not very user friendly.

Other beverage preparation machines have been described which provide mechanical adapters for adapting various types of containers inside the same brewing chamber of a beverage preparation machine. Each of these systems however, requires handling of a spare part by the user, correct selection of the adapter specifically required by each type of container, and then proper positioning of the container inside the adapter and then of the adapter inside the machine brewing chamber. Such adapters are therefore not user-friendly at all.

Yet, another beverage preparation system is disclosed commercially which is brand-named "Twin" and available on the Swiss market since 2016. This system is manufactured by the Swiss company DELICA, and comprises a beverage preparation machine and a set of capsules of different types. The machine comprises a brewing chamber having a stationary fluid injection portion, and a removable capsule holder having two insertion slots for accommodating two capsules of different types at a time. By switching an actuator, the user is able to manually brew an ingredient from one, then the other capsule. The machine comprises in the same brewing chamber, two different kinds of injection devices, each one adapted for one type of capsules. Similar to the Tuttoespresso system described above, this machine, although providing some benefits, has the disadvantage that it offers a limited variety of possibilities to accommodate various types of ingredient containers, due to the fact that all of the types of containers have to fit into a common brewing chamber. Furthermore, this machine is limited by a fixed size of the capsules holder. This calls for a pre-determined size of the ingredient containers, and it also limits greatly the flexibility in size, shape, or structure of the containers inserted therein: basically, only different capsules having limited differences in size and shape can be inserted in the same capsule holder. This leads to at least two main drawbacks.

First of all, the type of technology that is used for mixing, extraction, infusion or dissolution of the ingredient is very close. Therefore, whatever the differences in the type of ingredient which is contained in one or the other container inserted in the capsule holder, the injection of water will be about the same, for instance, injection needles piercing through rigid or semi-rigid capsules having a frusto-conical shape (which is the case with the Twin machine). It is therefore impossible to adapt the type of water injection in terms of volume, pressure, temperature, fluid dynamics inside the container, to each individual ingredient, in order to enhance the final in-cup quality.

Secondly, whatever the ingredient amount which is required for a given volume of product to be delivered to the cup, the ingredient container necessarily has a fixed shape and size in order to fit into the capsule holder. In many instances where the amount of ingredient is less than the total internal volume of the container, the latter therefore contains a headspace. Such a headspace is detrimental to the consumer: the container is bulkier than necessary. Furthermore, the beverage system is not environmentally friendly because packaging material is used, which could be saved if the beverage system could adapt the volume of ingredient container to the actual volume of ingredient which is necessary for preparing one given beverage (or food) product.

The technical problem underlying the invention is therefore to solve the drawbacks of the known beverage preparation systems, and especially provide a beverage preparation system combining a beverage preparation machine with ingredient containers, which is able to produce the best quality beverage in a user-friendly way, providing automated and either sequential or simultaneous production of beverage components for multi-component beverages, said machine being manufactured from the lowest possible amount of mechanical components.

SUMMARY OF THE INVENTION

The invention is achieved with a beverage preparation system and beverage preparation machine according to the appended claims.

More precisely, the invention is achieved with a beverage preparation machine according to any one of the appended claims hereafter.

In particular, the beverage preparation machine according to the invention comprises:
- a fluid system comprising a fluid source, a fluid pump, a fluid heating element,
- at least two container holders adapted for receiving corresponding beverage ingredient containers,
- a control unit arranged for controlling the fluid system in a manner to prepare a beverage by mixing fluid with the beverage ingredient contained in the containers to produce a beverage component in each of the containers,
- wherein the control unit is further arranged to dispense part or whole of the beverage components sequentially or simultaneously to produce the beverage,
- wherein the container holders differ from one another for holding containers of different sizes and/or types and,
- wherein it further comprises separate fluid delivery interfaces having different structural and kinematic configurations, and arranged for independently delivering fluid in one of the corresponding ingredient containers, each interface being connected to the fluid system and being adapted (especially in shape, and in the way it introduces fluid into the container) to a different container.

Advantageously, the fluid delivery interfaces comprise different fluid delivery elements which characteristics differ amongst at least one or a combination of the following characteristics: number of delivery elements, number of delivery outlets in each element, fluid delivery outlet shape, fluid delivery outlet diameter, fluid delivery outlet flow direction, flow conducting channels size of each interface (number, diameter and/or length).

Preferably, the control unit is arranged to control the fluid system for each of the delivery interface in a different manner such that at least one or a combination of the fluid temperature, the fluid flow rate, the fluid pressure or the fluid volume that is delivered in one container, differs from that of the fluid delivered in the other container.

In a highly preferred embodiment of the invention, the type of fluid delivery element is chosen within the list comprising:
(a) At least one fluid injection needle able to pierce through the wall of an ingredient container and protrude hereinto for injection of fluid,
(b) A shower plate able to distribute fluid over at least a fluid-permeable portion of the ingredient container.

In one embodiment, at least one of the fluid interface is connected to the rest of the machine fluid system through a releasable fluidic connection, such that it can be detached from the machine and replaced by another type of fluid interface having the same releasable fluidic connection.

Advantageously, the machine further comprises a fluid-cooling element.

In a highly preferred embodiment of the invention, each of the separate fluid delivery interfaces of the machine differ by at least one structural element that involves at least one of the kinematic movements of rotation or translation. For instance, a first fluid delivery interface can be adapted for using a coffee pod that involves a simple back and forth translation of its main opening, closing and fluid injection elements, and the machine can further comprise a fluid delivery interface for using a water soluble ingredient sachet, which involves vertical and horizontal translation movements of the main opening, closing and fluid injection elements for functioning.

The invention further concerns a beverage preparation system comprising a machine as described and claimed therein, in combination with at least two containers taken from the list of: loose coffee pods, loose coffee pads, compacted coffee pods, rigid or semi-rigid capsules, flexible film containers such as sachets, composite containers such as sachets having a rigid portion, rigid or semi-rigid canisters.

Preferably, the containers respectively comprise:
(i) A first container to be held functionally by the first container holder, which is a coffee pod containing roast and ground coffee, the walls of the pod being made of a pierceable, rupturable or tearable laminated composite film with moisture and oxygen barrier properties,
(ii) A second container to be held functionally by the second container holder, which is a sachet made of a pierceable, rupturable or tearable film pouch sealed around at least one spout, said at least one spout element comprising at least one fluid injection inlet and at least one beverage dispensing outlet.

Advantageously, the headspace in at least one of the ingredient containers is lower than 20%, preferably less than 10%, most preferably less than 5%.

In a highly preferred embodiment of the invention, the ingredient containers are closed containers, which open at the time of use, in particular for receiving fluid therein, and for dispensing the beverage produced therein in an outside recipient container.

By "containers of different types", it is meant that the containers differ at least by the mechanical, geometrical, and/or chemical characteristic of their wall allowing fluid to be injected therein, and/or by the mechanical, geometrical, and/or chemical characteristic of their wall allowing dispensing of the beverage prepared therein. The containers of different types furthermore differ by their shape, by their inner volume, by their mechanical resistance to internal fluid pressure, by their barrier characteristics to gas (especially oxygen) or moisture transfer through their walls. The shape, dimensions, constitutive material, and also the mechanical set-up that allows mixing of the fluid with the ingredient contained therein, fare specific to the amount and composition of the beverage ingredient.

By "kinematic", it is meant all the mechanical movements that are necessary to hold a container in place in the container holder during the preparation of a beverage (or component of a beverage) therein. It is also meant the relative movements between the container and the fluid interface that interacts therewith, to ensure that said fluid delivery interface adapts functionally to the container it delivers fluid to, so as to be able to establish a fluid connection with said container. Such movements also encompass, if necessary, providing said container with appropriate movements to mix the fluid with the beverage ingredient. For instance, such movements are opening and closing movements of said container at its fluid entry side, and/or at its beverage delivery side. Such movements can also encompass mechanical actuation of a mixing device inside the container, if necessary.

BRIEF DESCRIPTION OF THE DRAWINGS

Additional features and advantages of the present invention are described in, and will be apparent from, the description of the presently preferred embodiments which are set out below with reference to the drawings in which.

DETAILED DESCRIPTION OF THE INVENTION

Figure 1:
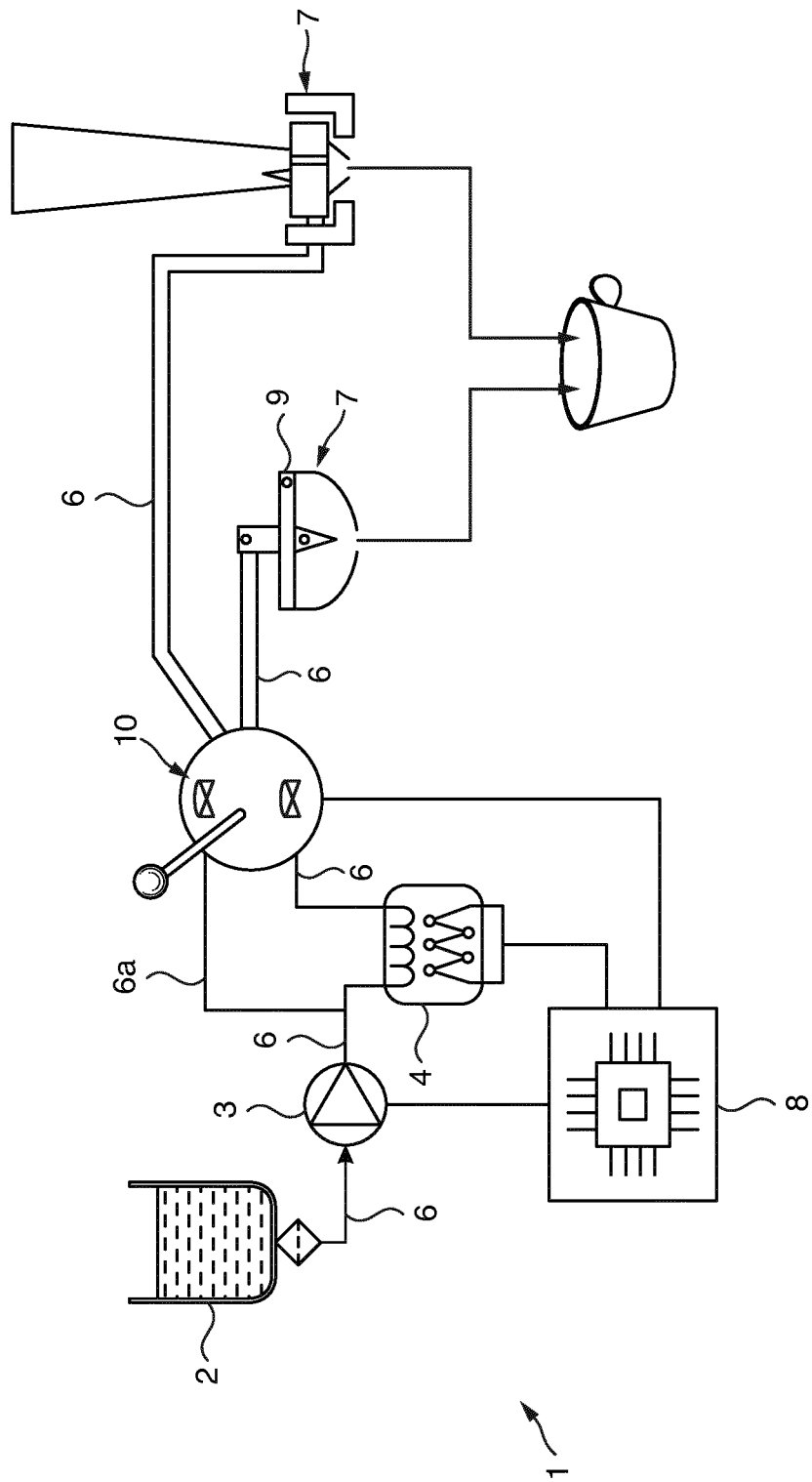
FIG. 1 is a schematic representation of a beverage machine according to the invention.

FIG. 1 illustrates schematically the set-up of a beverage preparation machine according to an embodiment of the present invention. Such a machine is a multi-ingredient machine. This means that the beverage that is eventually delivered to a consumer (e.g. into a cup), comprises at least two beverage components that require separate preparation in dedicated ingredient containers, so that optimal quality preparation of each component of the final beverage can be achieved. Such optimal preparation is obtained by a preparation process which is specific to each type of ingredient. For this reason, the structure of each ingredient container is adapted to a specific type of ingredient and mixing process.

By "structure", it is meant that the shape, dimensions, constitutive material, and also the mechanical set-up that allows mixing of the fluid with the ingredient contained therein, is specific to the amount and composition of the beverage ingredient.

Importantly, mixing of the fluid with the ingredient to prepare a corresponding beverage component must be performed in each respective container, so that optimal mixing conditions can be achieved. Furthermore, only the respective beverage component is delivered in a controlled manner to the consumer, typically in a beverage cup.

In the exemplary embodiments described in more details hereafter, two types of ingredient containers are used with the machine 1. One is a rigid pod containing roast and ground coffee, and the other is a flexible sachet (or pouch) containing a soluble powder (e.g. a dairy-based ingredient) or a liquid concentrate. The beverage preparation machine 1 therefore combines (at least) two different types of container holders and respective fluid delivery interfaces which are mechanically and kinematically different.

The beverage preparation machine 1 typically comprises a fluid system with a fluid source 2, a fluid pump 3, and a fluid heating element 4.

In the embodiment illustrated in FIG. 1, the fluid source is a detachable water reservoir 2 that is connected to the rest of the fluid system through a valve 5 and a set of fluid connecting pipes 6. Alternative fluid sources encompass tap-water connections, a non-water edible fluid canister, a water-bottle connection, for instance. In case of a water reservoir 2 as described above, a water filter (not illustrated in the drawing) can be included in the reservoir, to filter water that is pumped from said reservoir towards the fluid system pipes 6.

Preferably, the ingredients are chosen within the list of: roast and ground coffee, compacted or not, soluble powdered coffee, or leaf tea. It can also be dairy ingredients (e.g. milk or creamer), tea, chocolate, fruit juices, soups, vegetable juices, bouillons, tea, smoothies, purees, coulis, creams or a combination thereof, in powdered soluble form, liquid concentrated form having various viscosities, or in gel form having thixotropic properties.

All of these ingredients are in a form which is compatible with a dissolution, extraction or infusion in a liquid fluid, typically water, at cold state (between 4 and 20° Q, ambient state (from 20° C. to 35° C.), or hot state (between 35° C. and 95° C., preferably at a temperature comprised between 40° C. and 90° C.). The mixing fluid used is typically water.

More precisely, roast and ground coffee requires high fluid pressure for extraction of the coffee substances, in the form of a water film that passes evenly through the coffee bed. Further, long coffee cups such as "Grande" and "long cups" require bigger particles, and a longer volume of water passing through at a lower pressure (typically, a pressure comprised between 6 and 16 bar, preferably between 8 and 14 bar, and a volume comprised for a "long cup" between: 100 ml and 150 ml, and for a "Grande" between 150 ml and 500 ml, preferably between 160 ml and 300 ml). Instead, shorter coffee cups such as "Espresso" and "Ristretto" require less volume of water passing through, at a higher pressure (pressure comprised between 10 and 20 bar, preferably between 12 and 18 bar, and a volume comprised between 15 and 30 ml for "Ristretto", and comprised between 30 and 60 ml, preferably between 40 and 50 ml for "Espresso").

On the other hand, when the food or beverage ingredient is a soluble food or beverage ingredient, it is selected in the list of:
- instant coffee powder, milk powder, cream powder, instant tea powder, cocoa powder, soup powder, fruit powder or mixture of said powders,
- a coffee concentrate, a milk concentrate, a syrup, a fruit or vegetable concentrate, a tea concentrate, a fruit or vegetable puree.

The powders can be agglomerated or sintered. The powders or liquid concentrates can be mixed with solid pieces for example for preparing soups with solid pieces. The food or beverage ingredient can also be an infusable food or beverage ingredient like a roast and ground coffee or tea leaves. In that embodiment water extracts the infusable ingredient.

Soluble products require low pressure dissolution with a high speed jet to ensure a dynamic dissolution of powder particles with the fluid (in case the ingredient is under powder form). Depending on the type of ingredient (soluble powder or liquid concentrate) and its composition (e.g. milk, chocolate, soup, with or without particles, etc.) and more generally, depending on the chemical composition, viscosity of the liquid concentrate, and size of powder particles, the ingredient may require different types of preparation sequence, that is to say, variations of fluid pressure, and/or flowrate of the fluid injected into the container can be modulated during the same dissolution cycle, to ensure full and even dissolution of the liquid concentrate, or powder particles, into the mixing fluid (e.g. hot water).

The fluid that is circulated through the fluid system of the machine according to the invention is preferably water. However, alternative fluids could be used, such as milk, juice and other edible liquids. Such fluid may or not contain gas in an amount sufficient for creating a sparkling beverage. Such gas is either naturally present in said fluid, or is added from an independent gas source, either independently, or directly within the machine by an in-built gas-mixing system. Such gas-mixing systems, using a gas-pump, or pressurized gas containers, are known in the art.

The beverage machine 1 further comprises at least two container holders 7 adapted for receiving corresponding beverage ingredient containers, as illustrated in FIG. 1. According to the invention, the container holders 7 differ from one another, so that they are adapted to hold ingredient containers of different sizes and/or types. The two different container holders for use in machine according to the embodiment described herein, will be described further below.

A container holder 7 is a mechanical element adapted for ensuring static positioning of the container within the machine 1, at least during the time it actually functions to prepare a beverage, so that the corresponding fluid interface 8 can be connected to the container in a functional manner for injecting fluid therein or therethrough.

Figure 4:
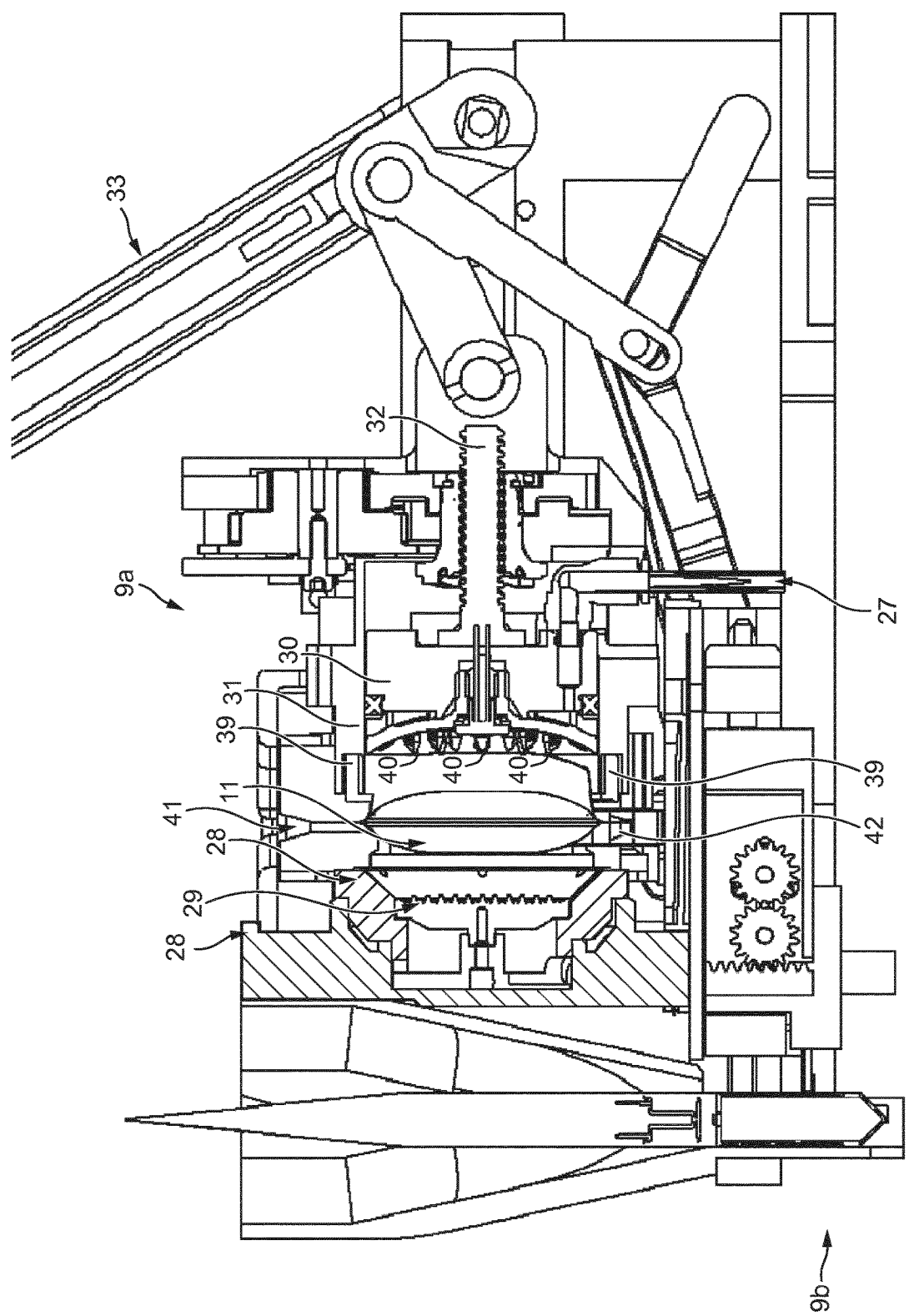
FIG. 4 is a schematic side general view showing one embodiment of different container holders and their corresponding fluid interfaces, in a beverage machine according to the invention.

In the embodiment illustrated in FIG. 4, the container holder takes the form of a groove into which the container is deposited (e.g. manually, or slid by gravity, or transferred mechanically from another location).

In another embodiment (not illustrated), the container holder is a more complex element such as a capsule holder, of the type described for instance in Applicant's European patent EP 1967100 B1. Optionally, the container holder comprises means to assist in the container opening (e.g. comprises means for piercing, tearing, or generally actuating opening of the container at its dispensing side, by effect of a mechanical, thermal, or chemical activation). In some instances, the container holder comprises means for assisting delivery of the beverage component to the consumer (e.g. it comprises a channel that guides the flow of beverage component towards the consumer cup). However, such a feature is optional.

The beverage machine 1 further comprises a control unit 8 arranged for controlling the fluid system in a manner to prepare a beverage by mixing fluid with the beverage ingredient contained in the containers to produce a mixed beverage component in each of the containers.

According to the invention, the control unit is programmed to dispense part or whole of the mixed components sequentially or simultaneously to produce the beverage. Control unit 8 can be any type of computer chip or chip board, with or without an internal memory, as known in the art.

In order to adapt the correct functioning parameters of the fluid system, to every ingredient container inserted therein, through control by the control unit 8, the machine 1 and containers, are preferably equipped with a container-machine recognition system. Such a recognition system is selected within the container-machine recognition systems known in the art, such as for instance 1-dimensional, or 2-dimensional barcodes such as e.g. those described in Applicant's European patents EP 2 481 330 B1, EP 2 525 691 B1 or EP 2 525 692 B1, or mechanical recognition of the type described in Applicant's PCT application WO 2014 029803 A1. The recognition system can also be chosen e.g. amongst colour recognition, conductivity recognition, or optical code recognition systems, such as those described for instance in Applicant's patent applications EP AN 16707015, EP AN 16196877, EP AN 16156864 or EP AN 17185291.

The container-machine recognition system comprises a set of individual codes located on the individual containers, and at least one sensor (or reader) located in the machine or otherwise functionally linked to said machine (through an external sensing device (e.g. a smartphone or other external electronic appliance bearing the code sensor) connected to the machine). The sensor is linked to the control unit, so that decoding of the code of a given container, triggers working settings of the machine's fluid system adapted to the corresponding container ingredient. Such working settings or parameters include, but are not limited to, at least one or a combination of: the fluid temperature, the fluid flow rate, the fluid pressure, or the fluid volume that is delivered in one given container. By applying different codes to each individual type of ingredient container, and because the machine according to the invention comprises container holders and fluid interfaces which are separate, and adapted to function with each type of container (e.g. rigid capsule, soft pod, flexible sachet), it is therefore possible to ensure that the above mentioned beverage preparation parameters are adapted individually to each container that is inserted inside the machine, in order to extract each type of ingredient the best possible way.

Generally, the fluid pressure that is taken into consideration is the fluid pressure that is measured at the junction between the fluid interface of the machine, and the ingredient container. This pressure is not necessarily the same as the actual fluid pressure inside the container's ingredient compartment. For instance, fluid pressure that is delivered at the injection port of a flexible sachet is the fluid pressure of the machine's fluid system. Such a pressure—delivered by the fluid pump—can be e.g. 19 bar. However, the pressure inside the sachet then drops due to the mechanical resistance created by the ingredient, and because of the resilience of the sachet's walls, and mostly because of the beverage that is dispensed out of the sachet.

According to the principle of the invention, the beverage machine 1 further comprises separate fluid delivery interfaces 9 having different structural and kinematic configurations. In the rest of the description, the term "fluid injection interface" will be used as an example of a fluid delivery interface. Specific embodiments of such structural and kinematic configurations are described later in more detail, in relation to one exemplary embodiment of the invention. The fluid delivery interfaces 9 are arranged for independently delivering fluid, in the corresponding ingredient containers to which they are fluidly connected. Of course, each fluid interface is connected to the fluid system so that it receives fluid from the fluid reservoir, through the pump 3 and the heating element 4.

Each one of the fluid interfaces 9 is therefore adapted in shape, and dimensions, to the container to which it delivers fluid.

The fluid system described above is preferably simple in structure, and therefore comprises a direct connection in series between the fluid source 2 (e.g. water reservoir), then the pump 3, then the fluid heating element 4, and finally the fluid interfaces 9.

However, in an alternative illustrated in FIG. 1, said fluid system comprises an additional alternative fluid pipe 6a connecting the pump 3 to the fluid interfaces, which is mounted in parallel to, and by-passes, the heating element. In such a configuration, the machine further comprises a selection valve system 10 as illustrated in FIG. 1, that is able to select delivery of fluid towards the fluid interfaces 9, between either the fluid line that contains the heating element (hence delivering heated water), and/or the fluid line that by-passes the heating element (hence delivering non-heated fluid), in a sequential, or simultaneous manner. Such a configuration provides a possibility for the machine to deliver fluid to the containers that is not heated, and is therefore delivered by the fluid interfaces 9 to their corresponding containers at a temperature which is that of the fluid source 2. In the preferred embodiment shown in FIG. 1, the fluid selection valve 10 is connected to the machine control unit—like all other elements of the fluid system—, so that said control unit automatically switches the position of the valve in its closed state, or in an open state for conducting hot or non-heated fluid towards one or the other fluid interfaces 9 (sequential preparation), or to all of them at the same time (simultaneous preparation).

Optionally, the machine 1 further comprises a fluid cooling element, e.g. a Pelletier-effect device, or a compressor (not illustrated in the drawing) that is placed in the fluid system between the fluid source and the selection valve 10.

One example of a pump that is suitable for use in a machine according to the invention is a standard piston pump delivering a maximum output pressure of 20 bar.

However, as described above, the beverage preparation machine according to the invention comprises separate fluid injection interfaces 9 having different structural and kinematic configurations, and arranged for independently injecting (or more generally delivering) fluid in one of the corresponding ingredient containers; each interface being connected to the fluid system and being adapted to a different container. Therefore, there is a technical constraint of injecting fluid, e.g. water, in different types of containers containing different types of ingredients, from one single fluid system comprising one pump 3. This creates the need for a versatile pump, able to deliver a large span of pressures and flowrates, either sequentially, or simultaneously.

According to the invention, the fluid system's pump 3 delivers fluid in one or the other of the ingredient containers, at either low or high pressure, and at either low or high flowrate. The pressure range that is achieved by the pump in the context of the invention is comprised typically between 0 and 25 bar, preferably between 5 and 20 bar. The pressure range that is achieved by the pump in the context of the invention is comprised typically between 0 and 25 bar, preferably between 5 and 20 bar. The flowrate delivered by the pump to the container is comprised between 0 and 900 ml/min, preferably between 150 ml/min and 650 ml/min.

Typically, a fluid system of a conventional low-pressure machine, for example a coffee machine, delivers between 350 and 600 ml/min of water under a pressure comprised between 0 and 5 bars. A fluid system of a high-pressure espresso coffee machine delivers between 150 and 300 ml/min of water under a pressure comprised between 15 and 25 bars.

The machine according to the present invention can comprise various types of pumps for circulating a fluid from a fluid source (e.g. a reservoir or an external fluid line connected to said machine) in the conditions set out above. More precisely, the pump is selected from the—non-exhaustive—list of: piston pumps, solenoid pumps, gear pumps, screw pumps, rotary vane pumps, and peristaltic pumps. One additional type of pumps which is advantageous in the context of the invention is membrane pumps, especially those of the type described in Applicant's European patent application EP AN 17155317.

Membrane pumps allow a good adaptation of the pressure and flow rate of the fluid to be delivered to a capsule depending on the beverage to prepare. Therefore, by using a common fluidic system and a single membrane pump, different flow/pressure requirements can be used. Such solution is a flexible and cost-effective solution allowing a fine-tuning of the preparation process to enhance in-cup quality of the beverage.

The membrane pump described in Applicant's application EP AN 17155317 is advantageous as it comprises an integrated by-pass valve connecting a pump outlet to a pump inlet, in order to reduce the flow rate (F) above a certain pressure (P1) value. This provides particular flexibility in the relative adjustment of both pressure and flowrate, even during an extraction, providing also possibilities of modulation of these two parameters, in sequences.

According to the principle of the invention, the beverage machine 1 is adapted to beverage preparation from ingredient containers having different constructions, and containing various types of ingredients, in a simultaneous, or sequential manner. Some ingredients require an extraction, others either an infusion or a dissolution. The machine according to the invention comprises a fluid system, and especially a pump and fluid interfaces, adapted for delivering fluid to the containers, at a pressure, temperature and flowrate which are compatible with either extraction, infusion, or dissolution values.

By "extraction", it is meant a high-pressure contact of fluid (typically heated water) with solid particles (e.g. roast and ground coffee). Extraction pressure is typically between 5 and 25 bar, preferably between 7 and 20 bar. The flowrate is comprised between 20 ml/min and 350 ml—preferably between 50 and 250 ml/min.

By "infusion" it is meant a slow, low-pressure contact of heated fluid (typically water) with insoluble edible ingredient (e.g. tea leaves). In the case of infusion, pressure is generally close to, or equal to atmospheric pressure. Infusion flowrate is typically comprised within the range of between 20 ml/min and 500 ml/min (overall flow rate for complete serving, potential pre-wetting included).

By "dissolution" it is meant solubilisation of ingredient powder particles, or ingredient gel phase, or ingredient liquid concentrate, within the fluid. In the case of dissolution of a powder, a gel or a liquid concentrate, fluid pressure delivered by the fluid interface at the container fluid entry point (not inside the container) is typically between 0 and 3 bar and flow rate is between 50 ml/min and 500 ml/min.

Figure 2A:
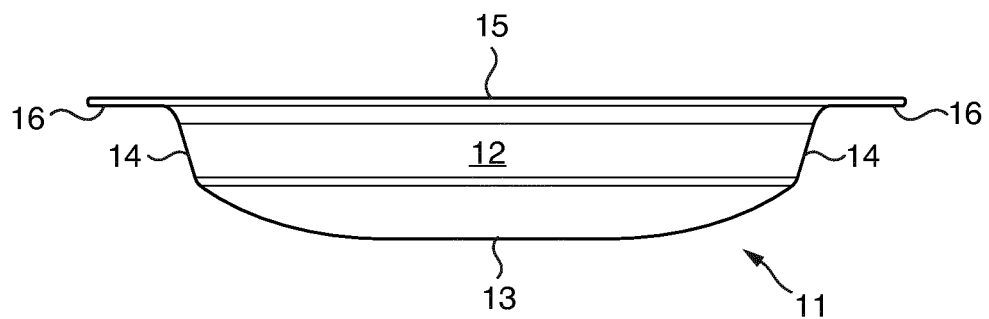
FIGS. 2A and 2B are respectively side, and bottom perspective views of a pod for use in a beverage machine of the invention.
Figure 2B:
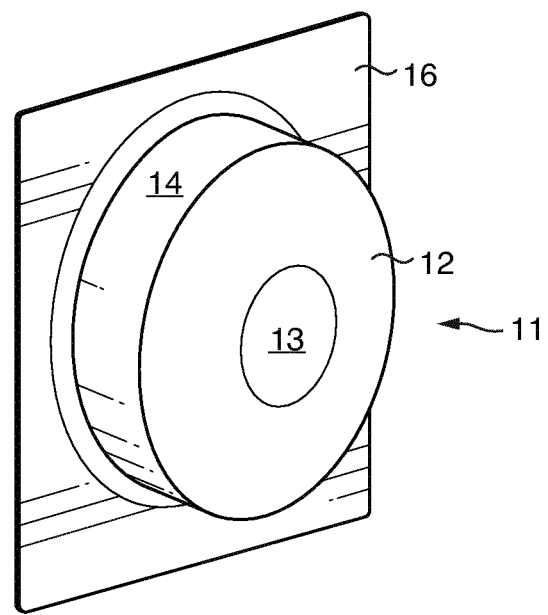

The first ingredient container, illustrated in FIGS. 2A and 2B, is a roast and ground coffee pod 11. Advantageously, the coffee contained therein is in a compacted or semi-compacted form.

The compacted coffee pod is made of a material comprising cellulose, having a paper weight (thickness) comprised between 20 g/sqm (gram per square meter) and 500 g/sqm, preferably between 50 g/sqm and 300 g/sqm. The pods are overwrapped, either in groups or individually, in packages having moisture and oxygen barrier capabilities. As an alternative, the coffee pod can be made with a multi-layer thermoplastic-aluminium material providing oxygen and moisture barrier properties, such that an overwrap barrier package becomes unnecessary.

Preferably, each pod has a diameter comprised between 20 mm and 60 mm. Such a diameter allows to ensure a proper sealing of the fluid interface 9 with the boundaries of the pod can be achieved without requiring a very high closing force from the machine (which would necessitate a heavy and expensive construction of the mechanical structure). On the other hand, the diameter is chosen not too small, to ensure that sufficient ingredient (e.g. coffee) is contained therein.

The thickness of the pod can be chosen appropriately, depending on the amount of coffee that is required for delivering the right volume of coffee in the cup. It preferably has a thickness comprised between 5 and 35 mm.

Each pod comprises a hollow cavity 12 which contains a volume of roast and ground coffee. The cavity 12 is full with ingredient, such that practically no head-space is present therein. The cavity 12 is defined by a bottom wall 13 and lateral walls 14 formed in one single part, and a top wall 15 attached to the peripheral edge 16 of the lateral walls 14. In the embodiment illustrated in FIG. 2A, the top wall 15 is flat. However, in another embodiment—illustrated in FIG. 4—the top wall 15 can also be convex. Other shapes (considered in the plane of the sealing between the top wall and the rest of the pod) can also be envisaged (triangular, square, round, spherical . . . ).

Figure 3A:
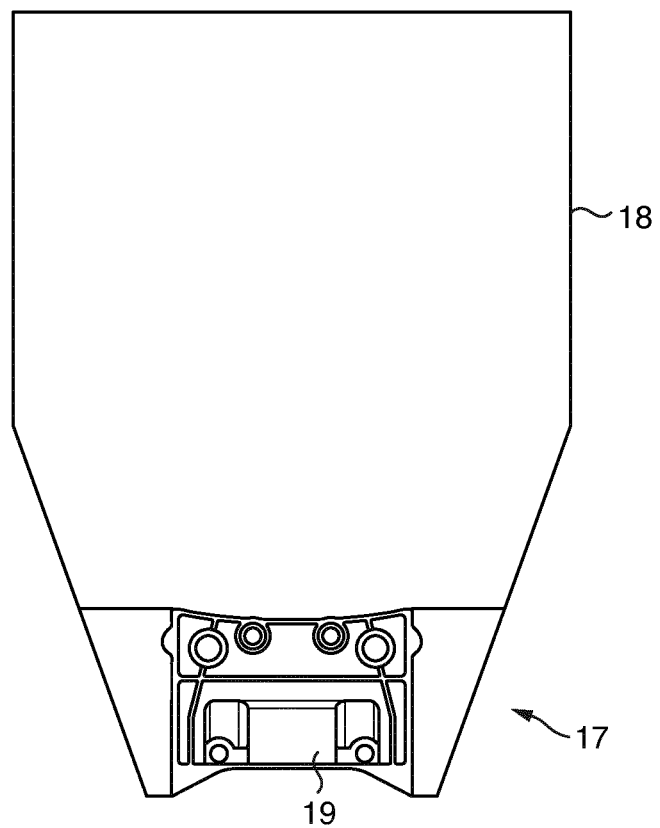
FIG. 3A is a front cut view of a sachet for use in a beverage machine according to the invention.

The second ingredient container illustrated in FIG. 3A is a semi-flexible sachet 17. The sachet 17 comprises a flexible cavity part defining an inner volume 18, said cavity being made of a film of thermoplastic, of paper, of alloy, of metal, or of a combination thereof. A rigid spout 19 is attached to the flexible cavity part, so that fluid injected by the fluid interface 9 into the spout 19, is delivered through an injection hole of the spout into the inner volume 18 of the sachet, for mixing with the ingredient contained therein.

The rigid spout illustrated in FIG. 3A is integrated within the boundaries of the film that forms the cavity (i.e. it is "overwrapped" into the film, so that it is not apparent from outside). In FIG. 3A, the sachet is represented with a transparent film forming the sachet cavity, so that the integrated spout is apparent.

An example of a sachet suitable for use with the beverage machine according to the present invention, is described for instance in Applicant's patent application PCT/EP17/070040.

The so-called "rigid spout" is a fitment assembly 19 adapted to cooperate with a corresponding fluid delivery interface, a preferred embodiment of which is described afterwards.

Figure 3B:
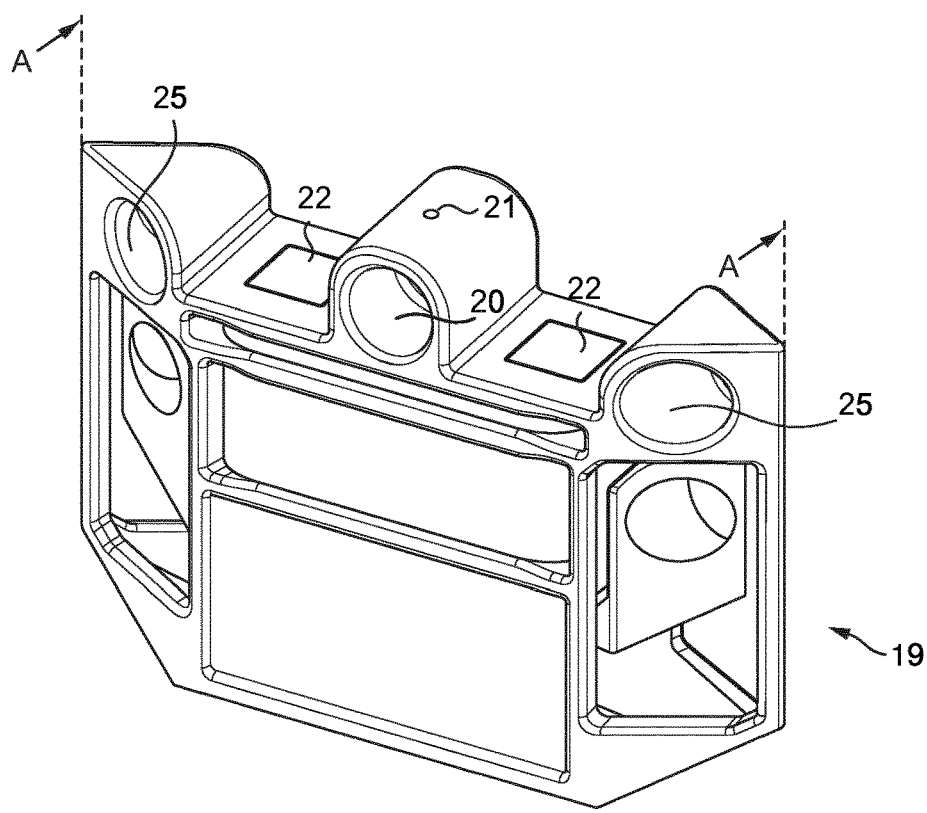
FIG. 3B is a perspective front view of a rigid spout for the sachet illustrated in FIG. 3A.
Figure 3C:
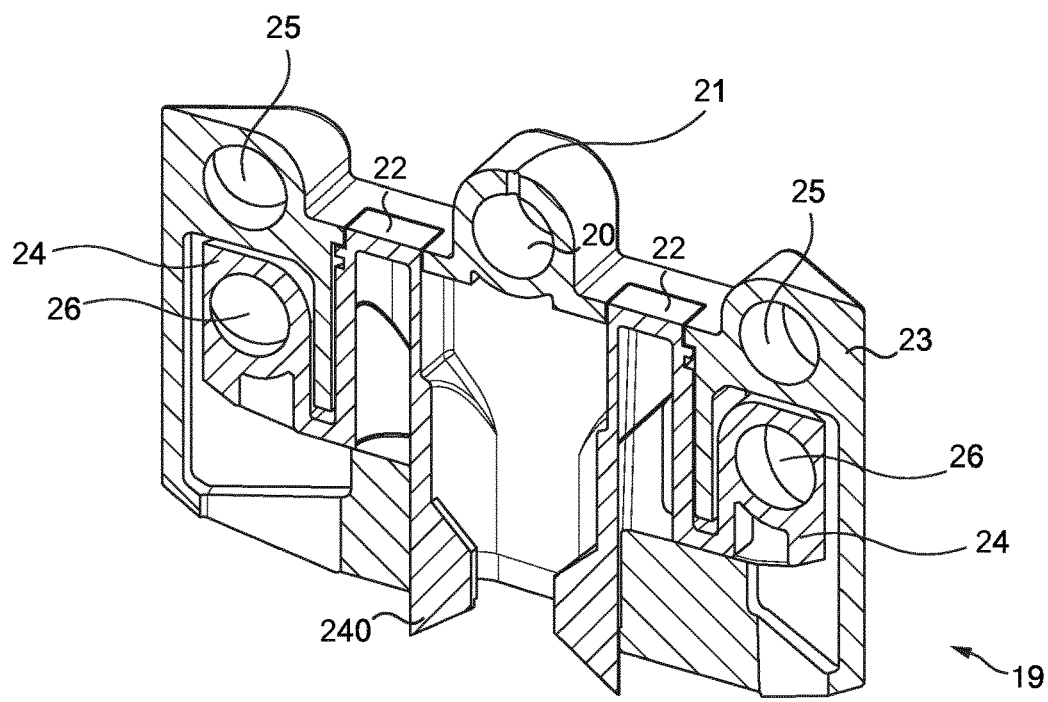
FIG. 3C is a perspective front cut view along A-A of FIG. 3B.

As illustrated in FIGS. 3B and 3C, the fitment assembly 19 comprises a fluid inlet 20 communicating with at least one injection hole 21 through which a fluid (typically water) can be supplied into the sachet 17, and two dispensing outlets 22 through which the food or beverage product is dispensed. The fitment assembly 19 further comprises two parts relatively moveable with respect to each other such that this relative movement opens or closes the communication of the inner volume 18 of the container with the fitment assembly 19 and/or further opens or closes the communication of the dispensing outlet 22 with the exterior of the fitment assembly 19.

As shown in FIG. 3C, the fitment assembly 19 typically comprises a primary part 23 that is stationary and assembled with the rest of the sachet walls. The fitment assembly 19 further comprises a secondary part 24 substantially vertically displaceable with respect to the primary part 23.

The fluid inlet 20 is arranged in the primary part 23 and communicates through the injection hole 21 with the inner volume 18 of the sachet.

In an embodiment, the primary part comprises two fluid inlets (FIGS. 3B and 3C do not illustrate two fluid inlets but only one, which is another possible embodiment), each communicating through a respective injection hole with the inner volume of the container, sequentially and/or simultaneously actuated as a function of the type of product prepared. In such an alternative embodiment, the fluid inlets are reversibly positioned so that the sachet can be used in either positions, front or back.

Through the fluid inlet 20 a fluid is supplied into the food or beverage ingredient contained in the film cavity 18, in order to properly mix the ingredients with the fluid injected to prepare the corresponding food or beverage product, or food/beverage component (if the final food or beverage is a multi-component product, e.g. milk and coffee, or milk and fruit).

The fitment assembly is preferably rigid and is made of a rigid plastic material, preferably by injection moulding. Typically, this plastic material can be selected from the following: polypropylene, polyethylene, polyethylene terephthalate and polylactic acid. Also according to a less preferred embodiment the fitment assembly can be made of a metal like aluminium or tin-plate.

As illustrated in FIGS. 3B and 3C, the sachet 17 further comprises two centering sockets 25 located close to the outermost lateral boundaries of the fitment assembly 19. The centering sockets are holes (or grooves) which are located in the stationary part 23 of the fitment assembly. The latter also further comprises two guiding sockets 26, which are holes (or grooves) located within the movable part 24 of the fitment assembly 19. The roles of the centring and guiding sockets 25, 26, will be described in more detail hereafter.

The sachet has a width comprised between 5 and 350 mm, preferably between 30 and 80 mm. It has a height comprised between 45 and 250 mm, preferably between 70 and 180 mm. It has a thickness comprised between 3 and 35 mm, preferably between 5 and 15 mm.

In the following, an exemplary embodiment of a multi-ingredient beverage preparation machine according to the invention is described. In this embodiment, the machine 1 comprises two different fluid delivery interfaces 9a and 9b as illustrated in FIG. 4 each of which is adapted mechanically, dimensionally, and kinematically to work with two different types of ingredient containers.

More precisely, FIG. 4 depicts the portion of the machine 1 wherein the ingredient containers are inserted and held in place during extraction. This figure does not show the rest of the machine, in particular the fluid system, the water reservoir, the control unit and the electric circuitry, nor the casing of said machine.

The machine 1 comprises a first fluid delivery interface 9a delivering high fluid pressure to the ingredient container, for preparing coffee based beverage preparations (hereafter "the coffee interface 9a"), and a second fluid delivery interface 9b for preparing a beverage (or beverage component) from a water soluble ingredient, for instance a water soluble powder (hereafter "the soluble interface 9b").

The coffee interface 9a comprises a fluid entry line 27 that is connected to pipes 6 and the rest of the fluid system (including the pump 3 and the fluid source 2), in a fluid conducting manner.

The coffee interface 9a further comprises a stationary part 28 of the brewing chamber that is fixed to the chassis (not illustrated) of the machine. In the embodiment depicted in FIG. 4, the stationary part of the brewing chamber comprises a beverage dispensing structure used for collecting beverage produced from the container contained in the brewing chamber. In the embodiment illustrated in FIG. 4, the stationary part 28 further comprises opening means for opening the coffee pod 11 at its beverage delivery end. The opening means comprises a plurality of raised elements having shape and dimensions adapted for stressing the material used for the pod walls until it ruptures in an open state (e.g. by tearing or piercing), thus allowing the beverage to flow out. In this embodiment, the beverage flows out through dispensing holes which are either located within the raised elements, or between them. In the embodiment illustrated in FIGS. 4 and 5A to 5I, the opening means are made of a series of piercing needles 29. The stationary part 28 has a cross section which is circular and has a diameter adapted to receive and hold the disc-shaped pod 11. Of course, other cross section shapes can be envisaged, depending on the shape of the pod, so that the latter functionally adapts to the stationary part 28.

In one alternative embodiment of the present invention (not represented in the drawing), the coffee pod is manufactured in a fluid permeable material, and does not require piercing of said pod surface to let the coffee beverage flow out. In this case, the stationary part 28 does not comprise raised elements, but only beverage dispensing holes to collect the beverage from the pod.

Figure 5A:
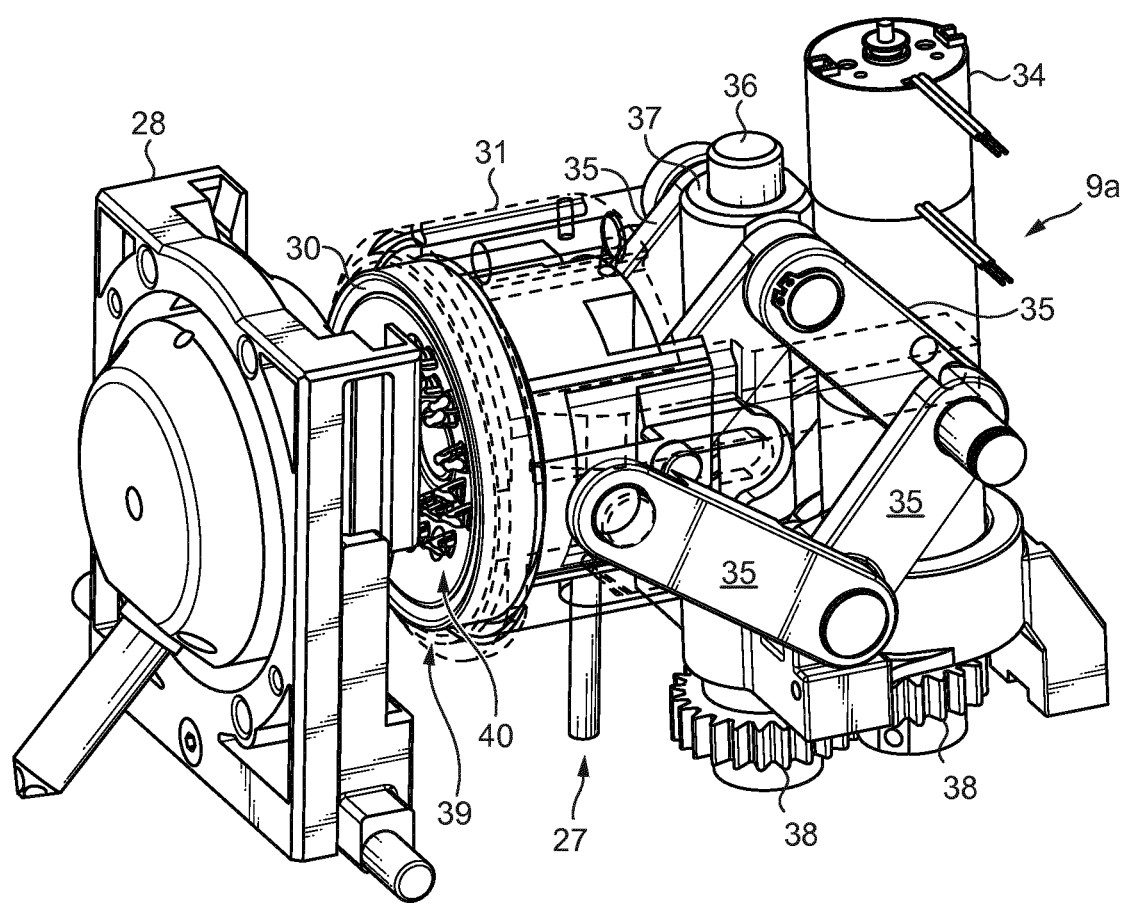
FIG. 5A is a perspective front view of the first type of container holder and its fluid interface, in the embodiment of FIG. 4, in its open state.

The coffee interface 9a further comprises a movable part 30 of the brewing chamber. As illustrated in FIG. 5A, the movable part 30 is a cylindrical element that is mounted in translation in a cladding structure 31 that is movable, relative to the chassis of the machine, so as to open and close the brewing chamber. The cladding structure 31 is attached to an actuation mechanism adapted for moving said structure 31 back and forth in translation relatively to the stationary part 28. The movable part 30 is also actuated in translation by an actuation mechanism. The movement of the movable part 30 is coaxial to the displacement of the cladding structure 31, with a reduced displacement length compared to that of the cladding structure 31. The reduced displacement length of the movable part 30 depends on the thickness of the pod. In an embodiment, each of the cladding structure 31 and the movable part 30 are linked to one specific actuation mechanism, but alternatively they are linked to one single actuation mechanism through a partially uncoupled mechanical system, such that the same actuator (e.g. a motor, or a lever) actuates both the cladding structure 31 and the movable part 30, but allows different displacement lengths. In the embodiment represented in FIG. 4, the actuation mechanism is a manual lever 33. However, in an alternative and preferred embodiment represented in FIGS. 5A to 5I, the actuation mechanism is electric and associates an electric motor 34 with a series of arms 35 forming a partially uncoupled crick mechanism that are moved by the motor 34 through a screw 36 and nut 37 system, and a gear mechanism system 38. The cladding structure 31 comprises a sealing ring 39 (illustrated in FIG. 5C) that seals the brewing unit when said cladding structure is moved forward against the stationary part 28, in the closed configuration of the brewing chamber.

The movable part 30 comprises a fluid delivery element which is used to deliver fluid from the fluid system of the machine, to the ingredient container (in the presently described embodiment, a coffee pod). In one embodiment depicted in FIGS. 4 and 5A to 5I, the fluid delivery element comprises a plurality of fluid injection needles 40 able to pierce through the wall of coffee pod and protrude hereinto for injection of fluid through the bed of coffee.

In the present embodiment, the fluid delivery element comprises 20 needles, each needle having a base diameter of between 1 and 5 mm, preferably 3 mm, and a base-to-tip length of between 1.5 and 10 mm, preferably 3.9 mm. The needles are made of plastic (alternatively, they can also be made of metal) and are hollow to let the fluid circulate from the fluid entry line 27 towards the coffee pod 11, as illustrated in FIG. 5C.

In an alternative embodiment of the invention (not represented in the drawing), the fluid delivery element of the coffee interface 9a comprises a shower plate able to distribute fluid over a fluid-permeable portion of the coffee pod. In this embodiment, no element of the shower plate pierces through the walls of the coffee pod. In this case, the pod is manufactured with a fluid permeable material able to retain the coffee inside (e.g. a cellulosic material, or a non-woven film material), so that fluid coming from the shower plate is distributed to the coffee bed inside the pod, through the fluid-permeable material.

Injection pressure of fluid delivered to the surface of the pod is comprised within the range of 8 to 19 bar, typically, and more generally within the range of pressures already provided for high pressure extractions provided in the present description.

As illustrated in the drawing, the movable part 30 and the cladding structure 31 have a cross section which is circular to adapt to the disc-shaped pod 11. Of course, other cross-sections shapes can be envisaged, to adapt to the shape and three-dimensional profile of the pod, and to the shape of the stationary part 28.

The coffee interface 9a is associated to a coffee pod holder 7a. In the embodiment depicted in FIG. 4, the coffee pod holder 7a comprises two parallel vertical insertion and holding grooves 41. (only one is depicted in the figure), that create a vertical insertion path for the pod. Furthermore, the coffee pod holder 7a comprises a holding breakpoint 42 at the bottom of the vertical insertion path, onto which the coffee pod rests when it is fully inserted. Breakpoint 42 is positioned at a height such that when the coffee pod 11 rests onto it, said pod is in alignment with the stationary and movable part of the coffee interface described above, as illustrated in FIG. 4. The coffee pod holder 7a is preferably movable vertically between a raised position—illustrated for instance in FIGS. 5B, 5C and 5D—which allows insertion of a pod 11 therein, and a lowered position—illustrated for instance in FIGS. 5A, 5E, 5F, 5G and FIG. 5H—wherein the pod 11 is in coaxial alignment with the stationary 28 and movable 30 parts of the coffee interface 9a.

In use, the pod interface 9a functions according to a specific kinematic configuration, which comprises horizontal and vertical movements that take place in a specific order, as follows.

Generally, the machine is turned "on" and a beverage preparation cycle is started, using a control panel, not illustrated in the drawing, which can be of any known kind (e.g. simple press button, tactile panel, a sliding door that is moved from an open to closed state for accessing, respectively closing, the pod insertion grooves 41, an application of a separate device remotely connected to the machine 1, etc.).

Figure 5B:
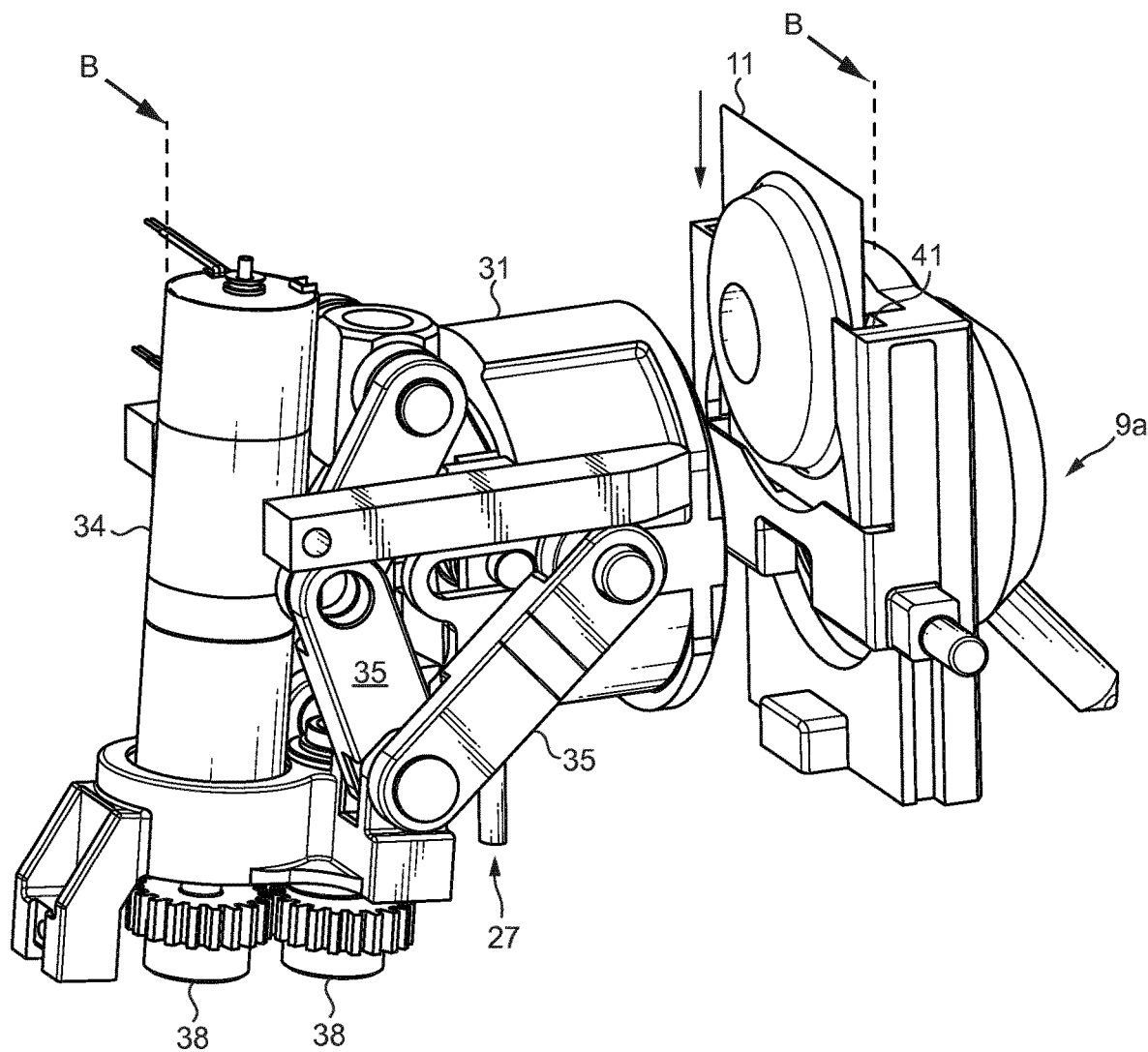
FIG. 5B is a perspective rear view of the container holder and fluid interface of FIG. 5A, with a container inserted therein.
Figure 5C:
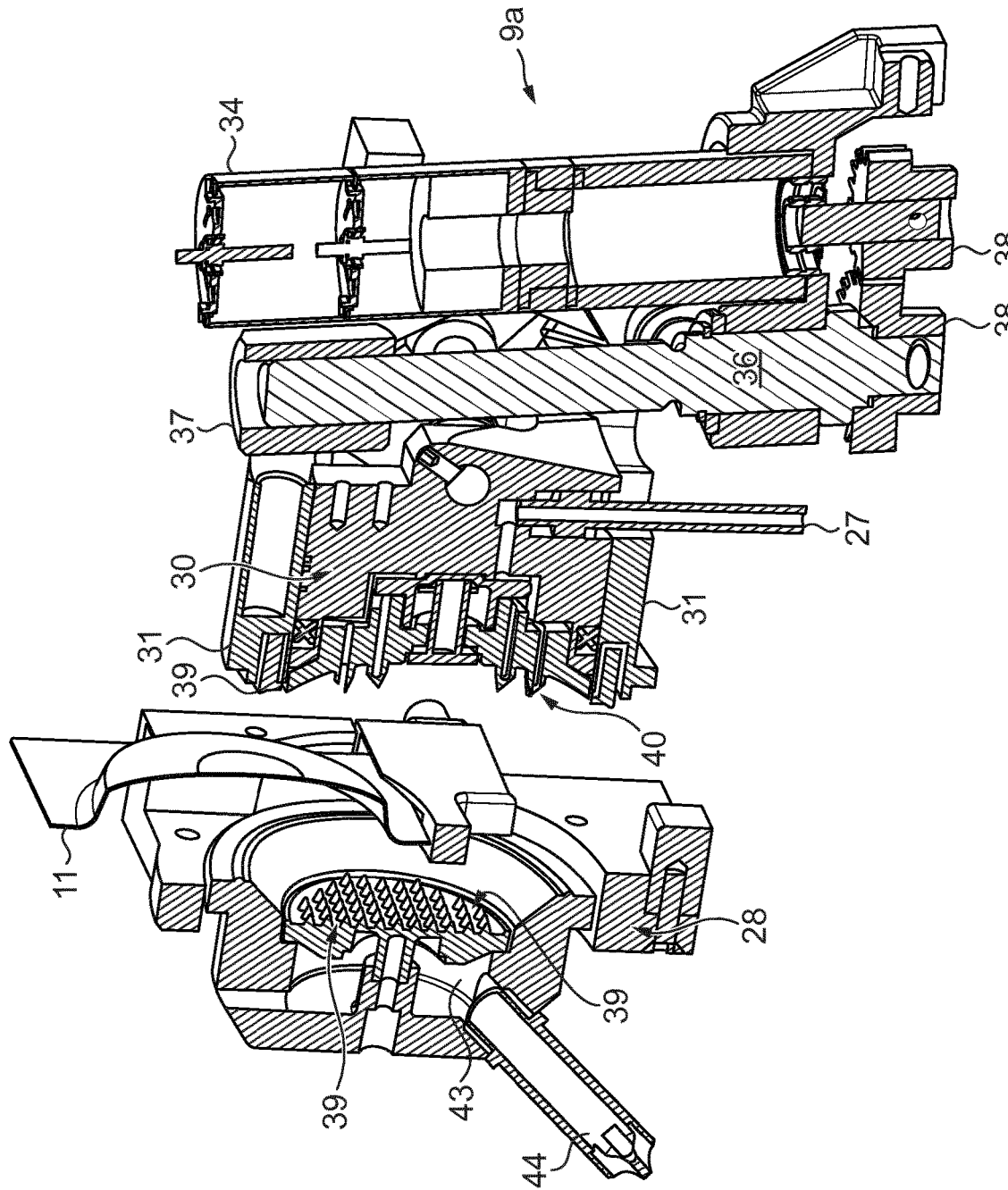
FIG. 5C is a perspective side cut view along B-B of FIG. 5B.
Figure 5D:
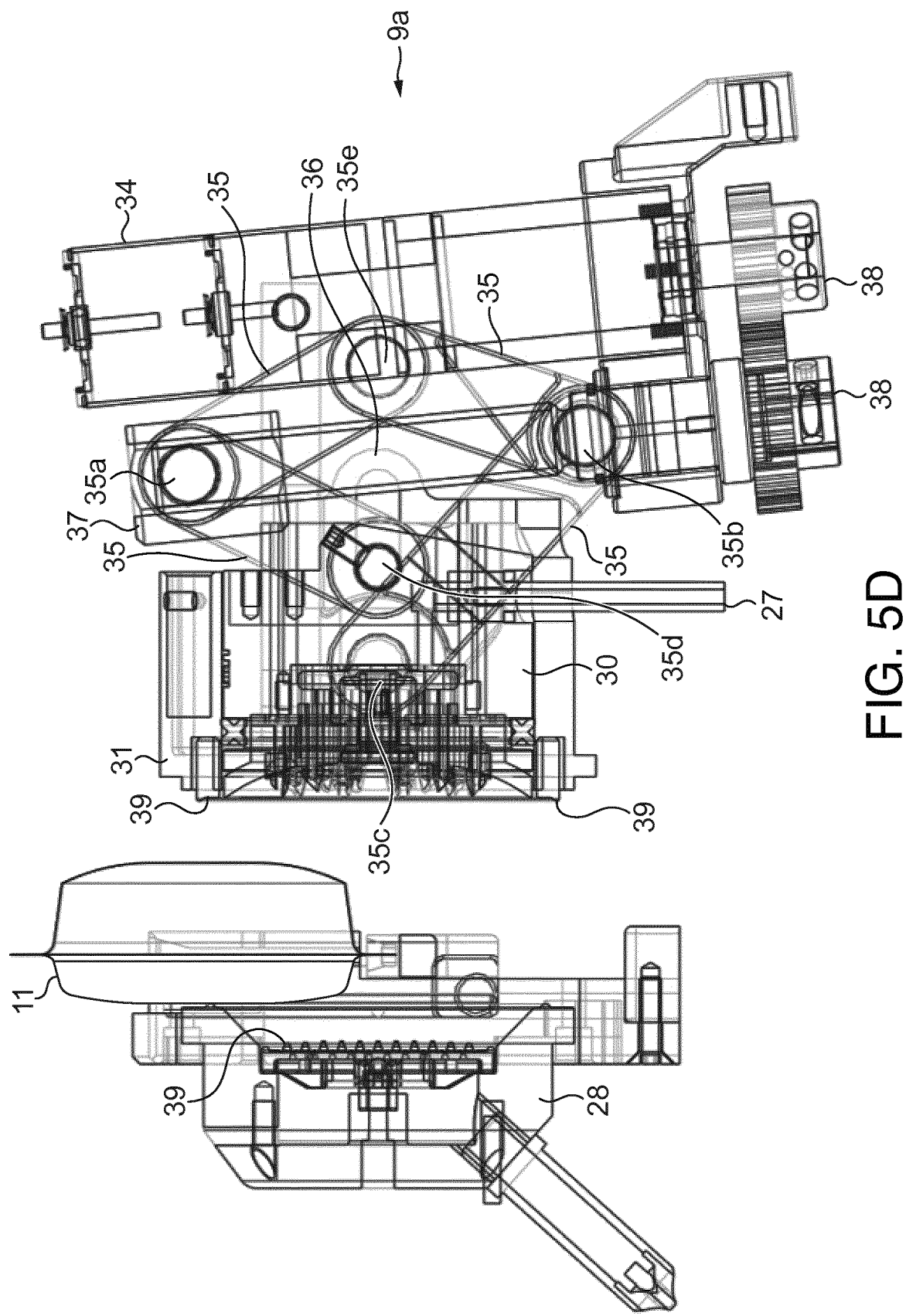
FIGS. 5D, 5E, 5F and 5G are schematic transparent side views similar to FIG. 5C, of the container holder and its fluid interface in various positions.

The pod interface 9a in its storage and inactive position is illustrated in FIG. 5B, FIG. 5C and FIG. 5C. In this position, the movable part 30 and cladding structure 31 are moved away from the stationary part 28, such that the brewing chamber is open. In this position, a coffee pod 11 can be inserted from above, sliding it into the grooves 41 towards the brewing chamber as shown by an arrow. In this position, the nut 37 is at the uppermost position along the screw 36.

At any time during insertion, an identification code, for instance a code as descried above can be read by a sensor (not depicted in the drawing), which will set the beverage preparation parameters automatically.

Figure 5E:
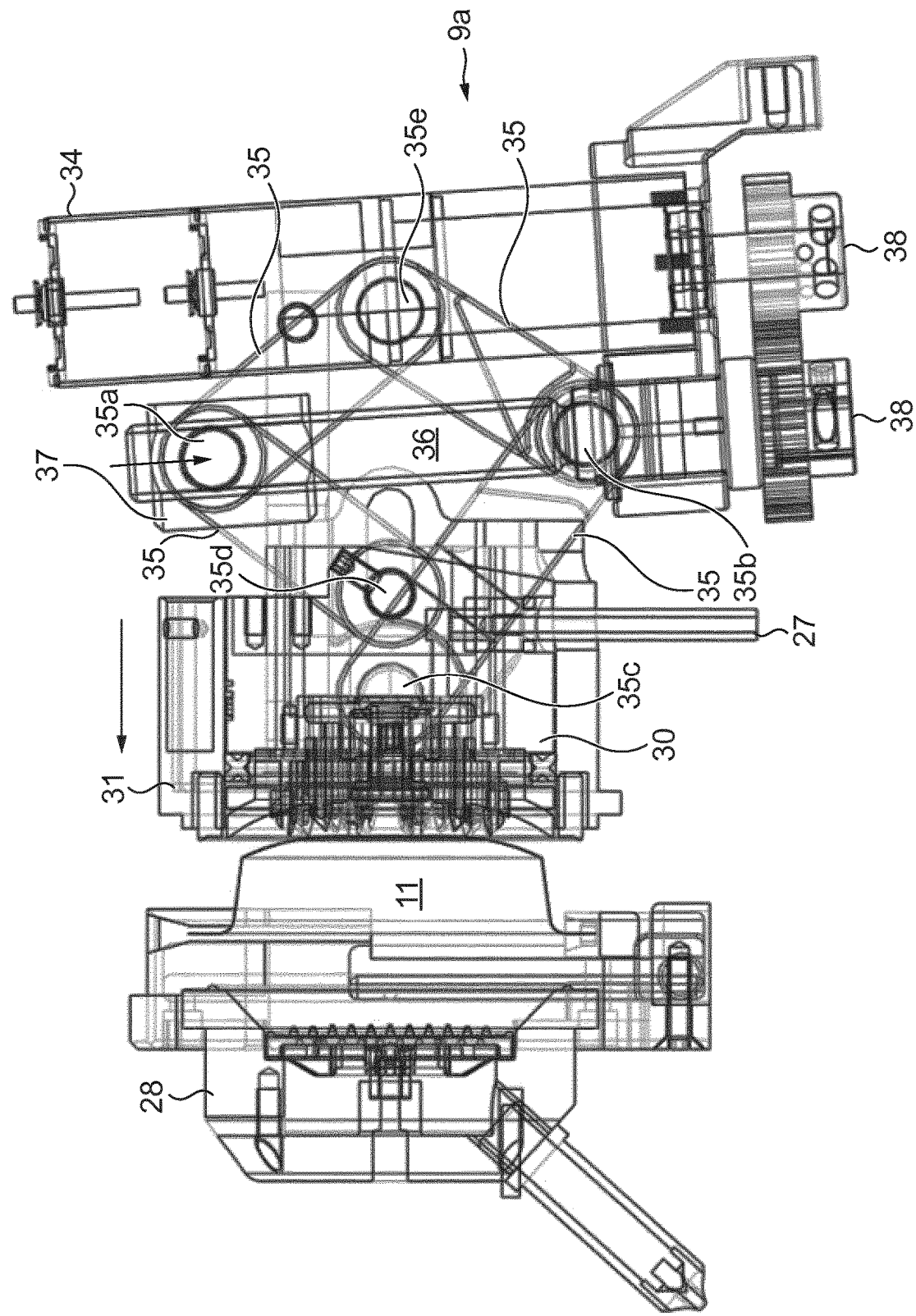

When the pod 11 is fully inserted within the machine and in alignment with the brewing chamber as illustrated in FIG. 5E, the latter is closed by moving the cladding structure 31 and movable part 30 towards the stationary part 28 of the fluid delivery interface 9a, as shown by an arrow in FIG. 5E. The movement is actuated by the motor 34 which rotates the screw 36 through gears 38, such that the nut 37 moves downwards along said screw. The movement of the nut actuates the movement of the movable part 30 and cladding structure 31, through the crick's arms 35, by bringing movable point 35a closer towards stationary point 35b, which simultaneously drives movable points 35c and 35d, away from point 35e, as illustrated in FIG. 5e.

Figure 5F:
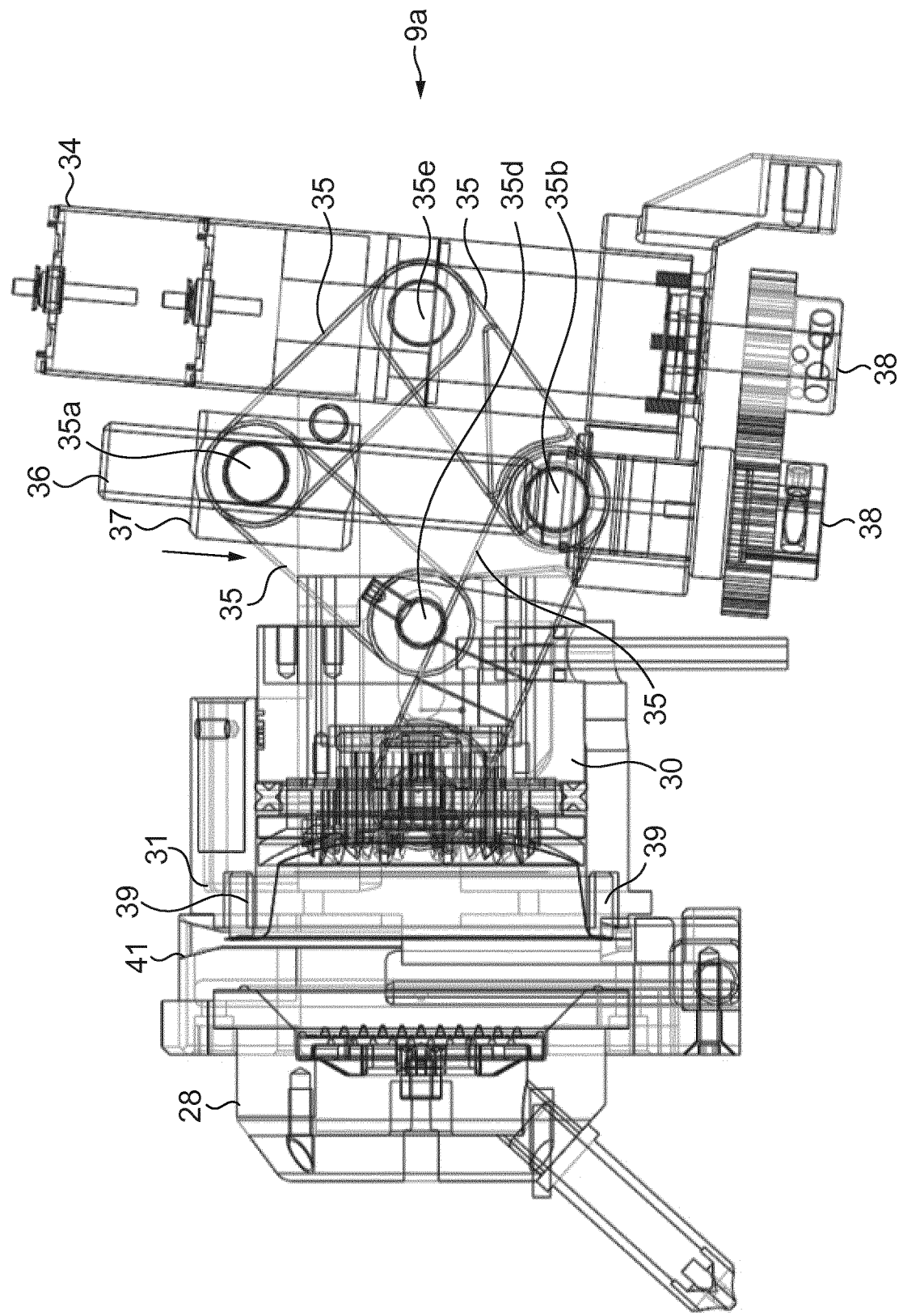

As the movement continues, the movable part 30 comes into contact with the pod 11 as illustrated in FIG. 5F and the fluid injection needles 40 pierce through the surface of the coffee pod 11.

Figure 5G:
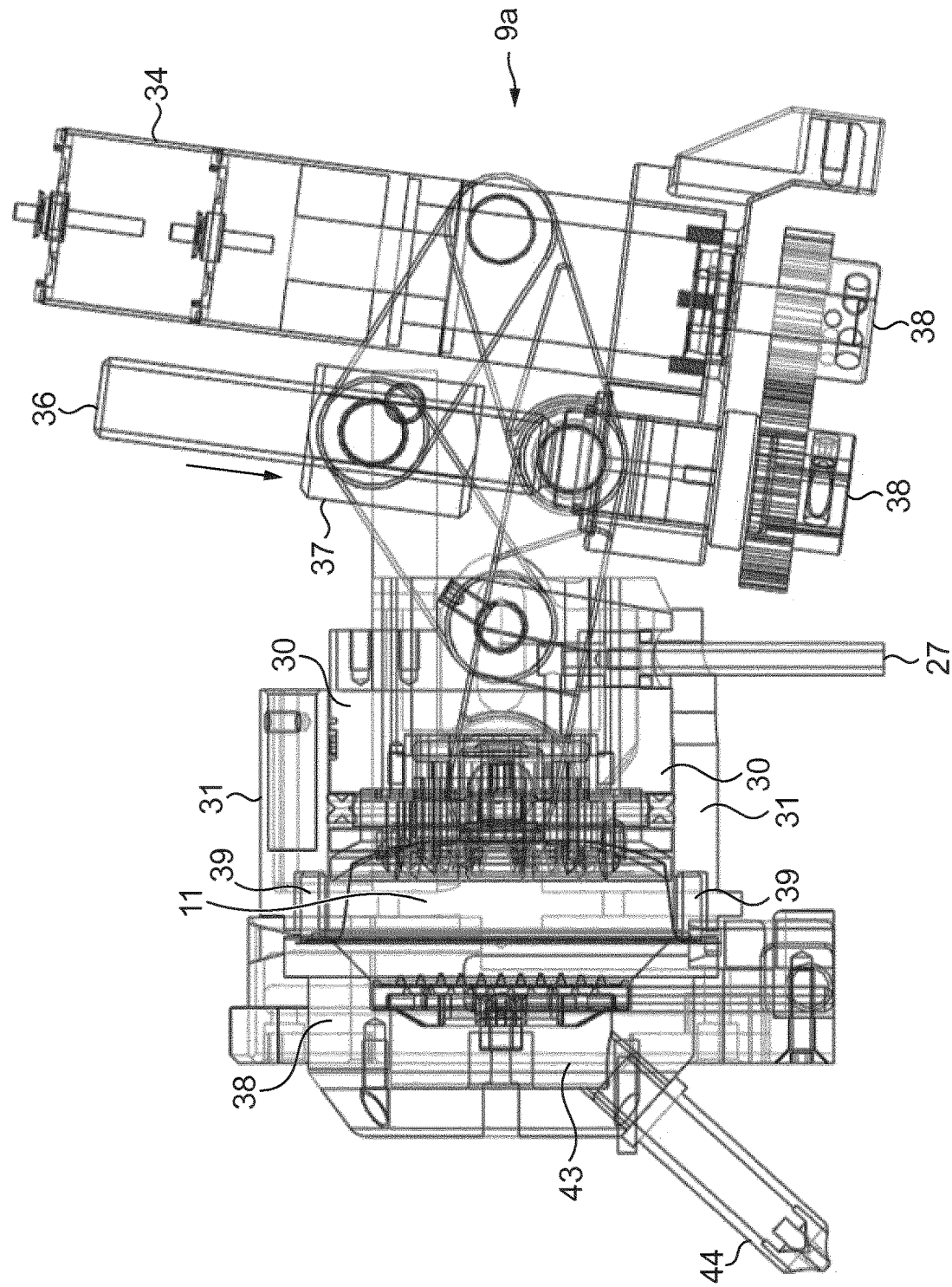
Figure 5H:
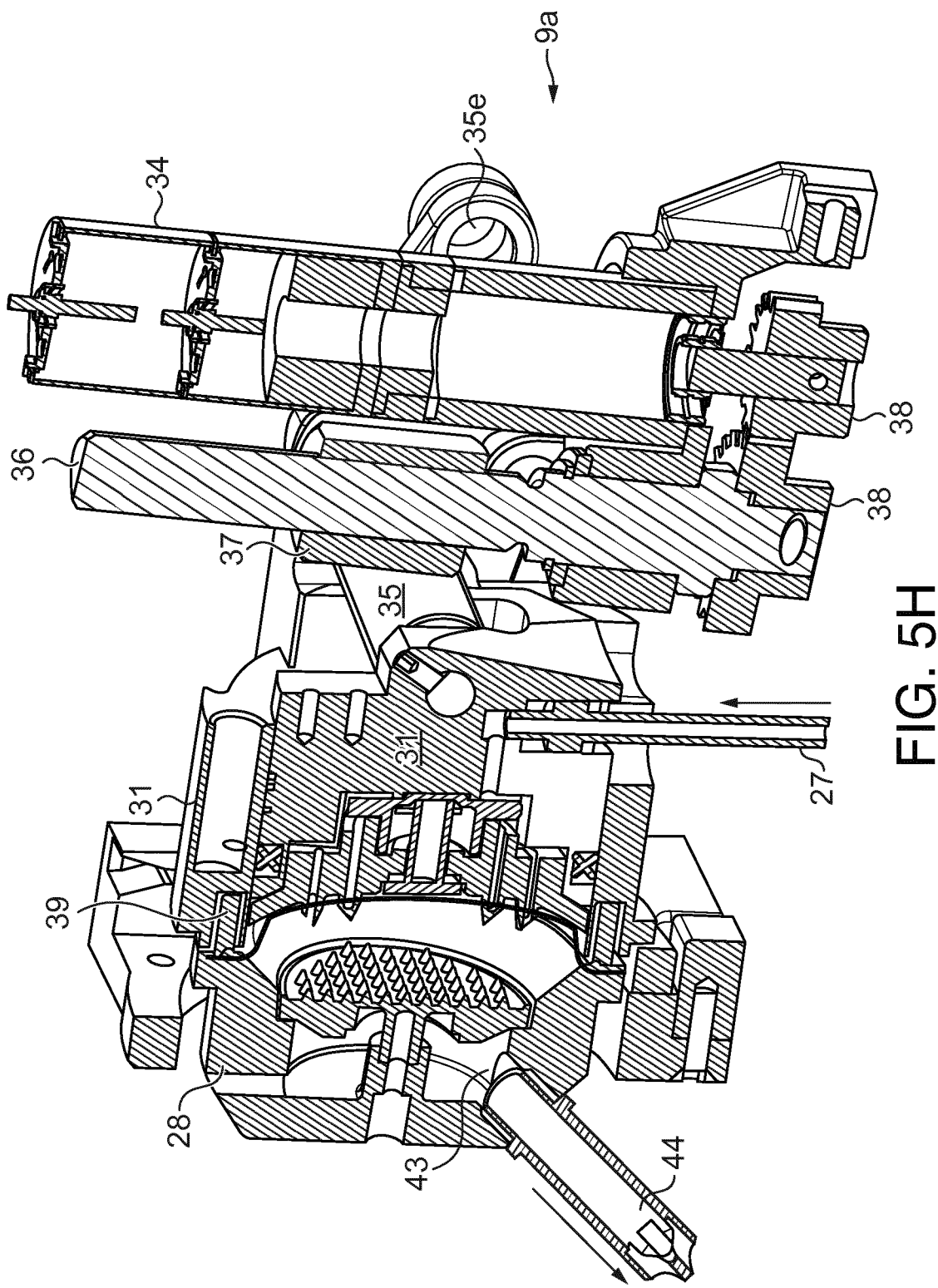
FIG. 5H is a perspective side cut view along B-B of FIG. 5B, showing the closed position of the fluid interface relative to the container holder.
Figure 5I:
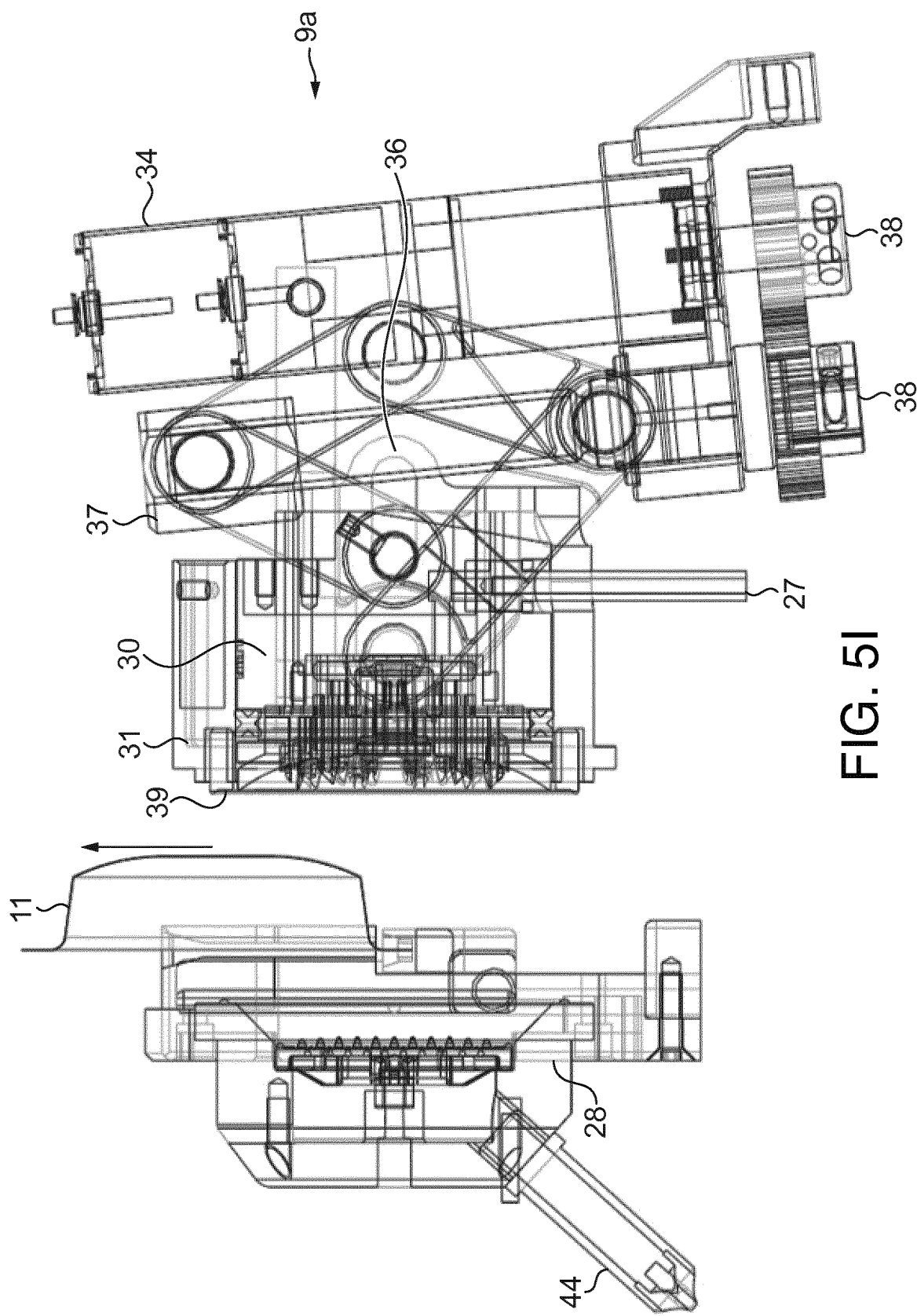
FIG. 5I is a schematic transparent side view of a container holder and its fluid interface as shown in FIGS. 4 to 5H, in its container-ejection position.

Finally, as the nut 37 is moved in its lowermost position along the screw 36, as depicted in the FIG. 5G, the cladding structure 31 moves even further, as it is moved at crick's point 35c by the actuation system (at this stage, point 35d remains stationary, despite the movement of nut 37, because of the geometry of the partially uncoupled crick mechanism). Once the nut 37 has reached its lowermost position along the screw 36, the sealing ring 39 of the cladding structure 31, rests firmly against the surface of the stationary part 28, so that the brewing chamber is closed and leak-tight, enclosing the coffee pod 11 therein. Water can be injected through fluid entry line 27, into the pod 11, to prepare coffee therein, which is then dispensed at the dispensing side of the stationary part 28. As the coffee pod piercing needles 29 of the stationary part 28 have pierced through the coffee pod 11 wall, coffee prepared in the pod can flow through said needles 29 into a collecting chamber 43 and then through a coffee dispensing spout 44 depicted in FIGS. 5C and 5H, towards the user's cup. After the coffee is prepared and dispensed, the brewing chamber of the coffee interface moves back in its initial open position, in order to allow extraction of the used coffee pod, as illustrated in FIG. 5I.

The total opening-closing stroke in translation of the movable pod interface elements as described above is comprised between 15 and 50 mm, preferably of 25 to 35 mm, more preferably it is 30 mm for the cladding structure 31, and comprised between 10 and 30 mm, preferably between 12 and 18 mm, more preferably it is 15 mm for the movable part 30. Preferably, the movement of translation of these elements is horizontal.

The machine 1 further comprises a second fluid delivery interface 9b delivering low pressure fluid to the ingredient container, for preparing beverage preparations (a beverage, or beverage component if the final beverage is made of several components such as milk and coffee for instance) from a water soluble ingredient, for instance a water soluble powder (hereafter "the soluble interface 9b"). The ingredient container in the preferred embodiment described hereafter is a sachet comprising a rigid part (in one or several independent elements) and a flexible part, as described herein before.

Figure 6A:
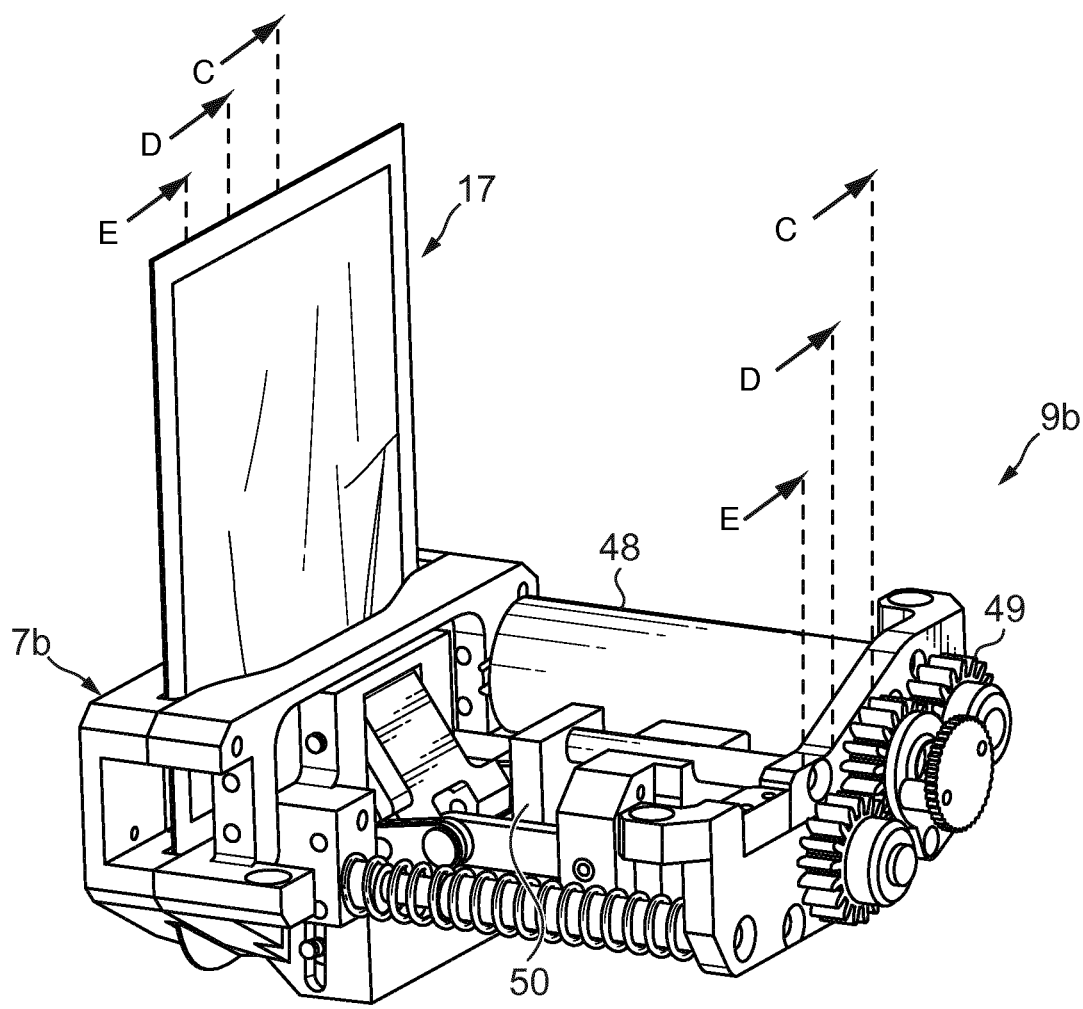
FIG. 6A is a perspective side view of the second type of container holder and its fluid interface, in the embodiment of FIG. 4, in its open state.
Figure 6B:
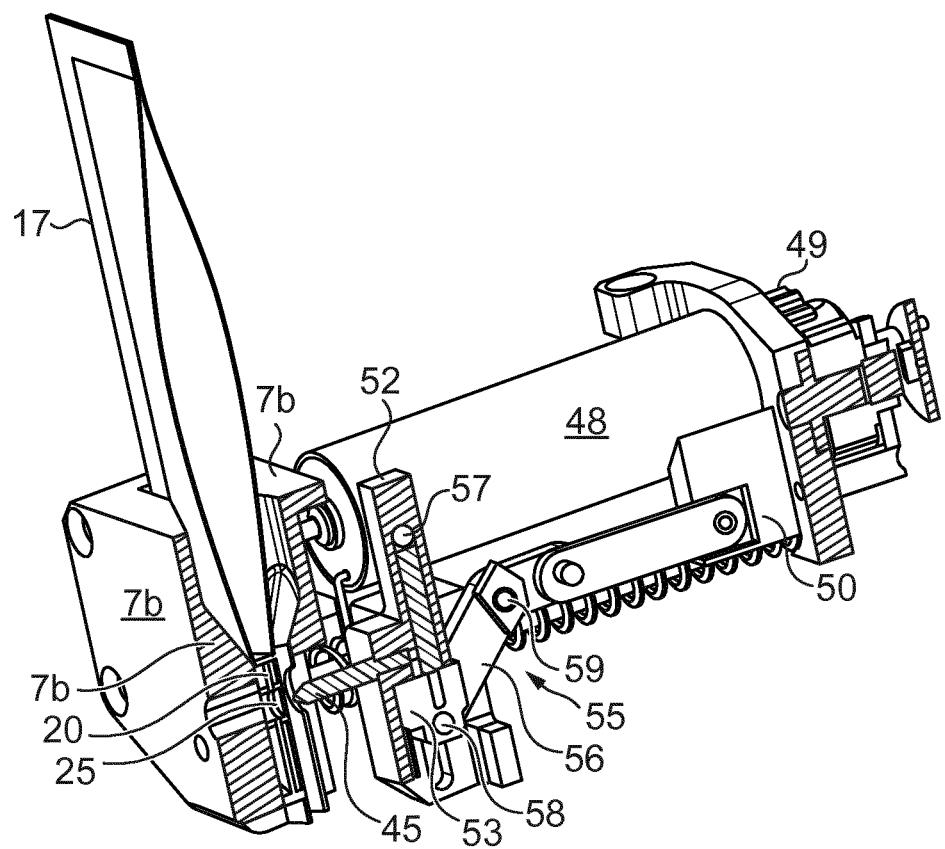
FIG. 6B is a perspective side view along C-C of FIG. 6A.

In use, the sachet 17 is placed vertically in the machine 1, with the rigid spout 19 at its lowermost end, as depicted in FIGS. 6A and 6B for instance.

The solubles fluid delivery interface 9b comprises a first set of elements, which holds firmly the sachet within said assembly when the latter is functioning. As illustrated in FIG. 6B, a set of two centring pins 45 (only one is represented in the drawing which is a cut view) is arranged within the interface 9b, which are movable in horizontal translation between a position (as shown in FIG. 6B) wherein the pins are retracted within the machine, and a position (not shown) wherein the centring pins 45 are moved towards the sachet 17 and inserted within the centring sockets 25.

Figure 6C:
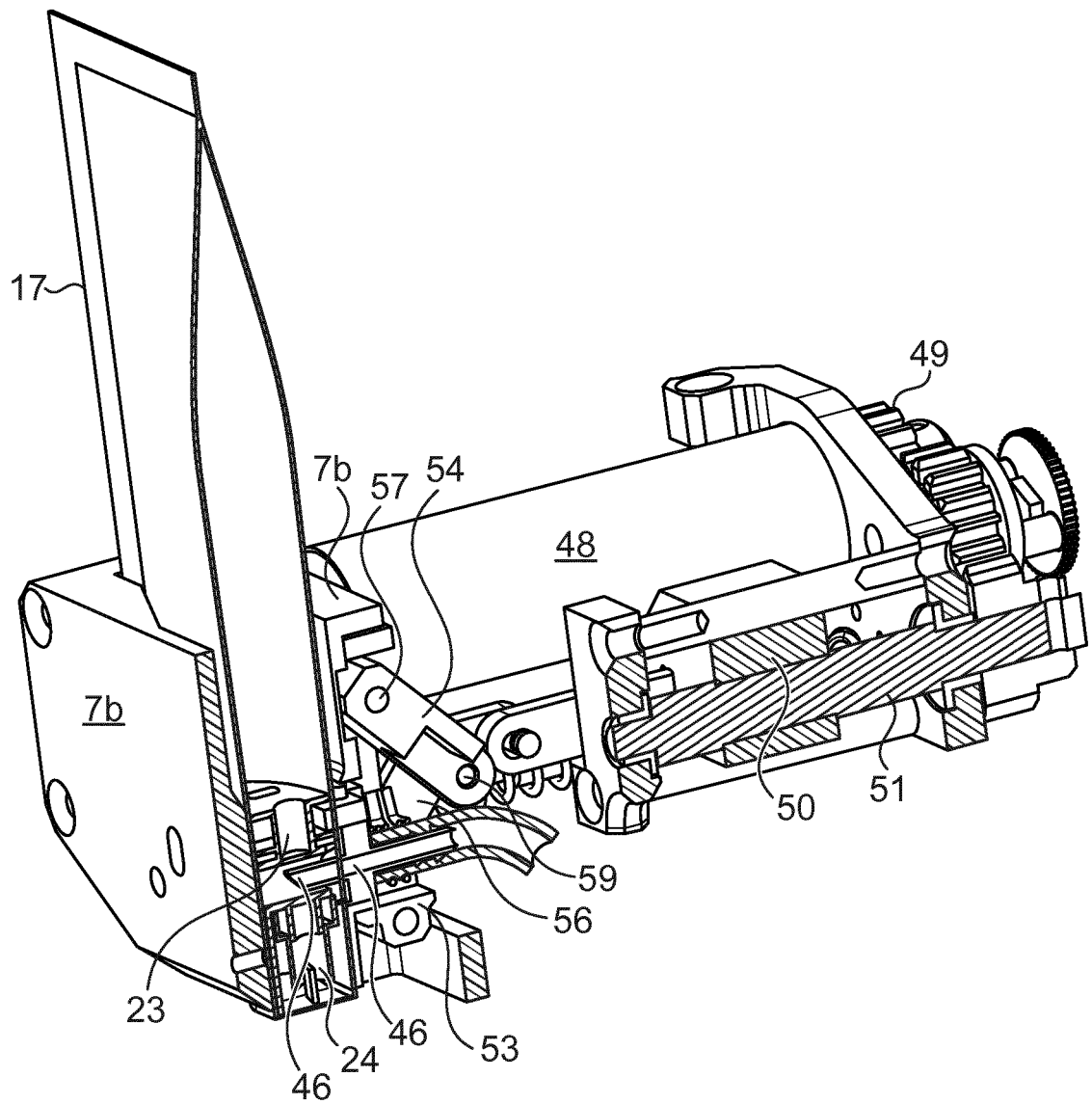
FIG. 6C is a perspective side view along D-D of FIG. 6A.

The solubles fluid delivery interface 9b further comprises a second element which allows injection of fluid within the sachet 17. More precisely, as illustrated in FIGS. 6A and FIG. 6C, the fluid inlet 20 of the sachet's fitment assembly 19, is pierceable by injecting and piercing means of the machine 1, preferably a fluid hollow needle 46 of the fluid dispensing interface 9b, called in what follows "injection needle", through which high pressure fluid is injected in the fluid inlet 20 of the sachet 17. However, it is also possible that the fluid inlet is directly accessible by injecting means which will inject fluid directly without the need to pierce any external lid or membrane. In a preferred configuration of the invention is that a flexible sheet of material which configures the container is also arranged covering the fluid inlet, this sheet being then pierced by the needle as it has just been described.

Preferably, water is injected at a pressure higher than 2 bars, more preferably higher than 3 bars, preferably comprised between 2 and 10 bars, more preferably of around 7 bars. This pressure is measured at the entry point, and is higher than the actual pressure within the sachet. The fluid inlet 20 is configured in such a way that the high pressure fluid injected through it by the injecting and piercing means is converted into a high velocity jet, which is driven into the container or containers. Typically, the diameter of the fluid inlet is comprised between 1 mm and 4 mm, more preferably between 1.5 mm and 3 mm and comprises a yieldable cover over it which can be pierced by the injecting and piercing means.

The injection needle 45 also comprises a toroidal ring (not depicted in the drawing), preferably made of rubber, ensuring that there is no leakage of fluid outside the fluid inlet while the injecting and piercing means are injecting fluid into the fluid inlet. The fluid inlet is communicated with the inside volume of the container through at least one injection hole, having a diameter of at most 1 mm, preferably of at least 0.24 mm, preferably comprised between 0.3 mm and 1 mm, preferably between 0.3 and 0.5 mm, more preferably of about 0.4 mm. With such a configuration, when high pressure fluid is injected by the injection needle 45 through the fluid inlet 20 of sachet 17, it is conveyed internally towards the injection hole 21, from which it is converted into a high velocity jet of fluid injected inside the sachet's internal compartment.

The fluid inlet can also be configured for providing an orientable high velocity jet into the container, preferably at about 90° with respect to the fluid supply provided into the fluid inlet by the injecting and piercing means, though any other angle would be possible and comprised within the scope of the present application.

By "jet" it is understood a stream of liquid or fluid that comes out of the fluid inlet and into the inner volume of the food or beverage container quickly and with force.

The fluid inlet 20 is configured for introducing fluid in the inner volume of the container with a high velocity, this fluid jet preferably presenting a velocity of at least about 20 m/s, preferably at least 30 m/s. As previously described, such a configuration is preferably obtained in the present invention by placing a constriction (that of the injection hole) in the fluid path in the fluid inlet to reduce the size of the section of the fluid inlet.

For the same fluid to be provided through the fluid inlet, the surface of the injection hole can vary according to the nature of the food and beverage ingredient inside the container which is to be mixed with the fluid. In particular when the ingredient is difficult to dissolve a smaller injection hole creates a jet with a higher velocity which improves agitation and dissolution of this ingredient in the container.

The solubles dispensing interface 9b comprises a third set of elements which allow opening and closing of the spout 19 of the sachet 17, by moving the moveable part 24 relatively to the rest of the sachet, especially relatively to the stationary part 23.

Figure 6D:
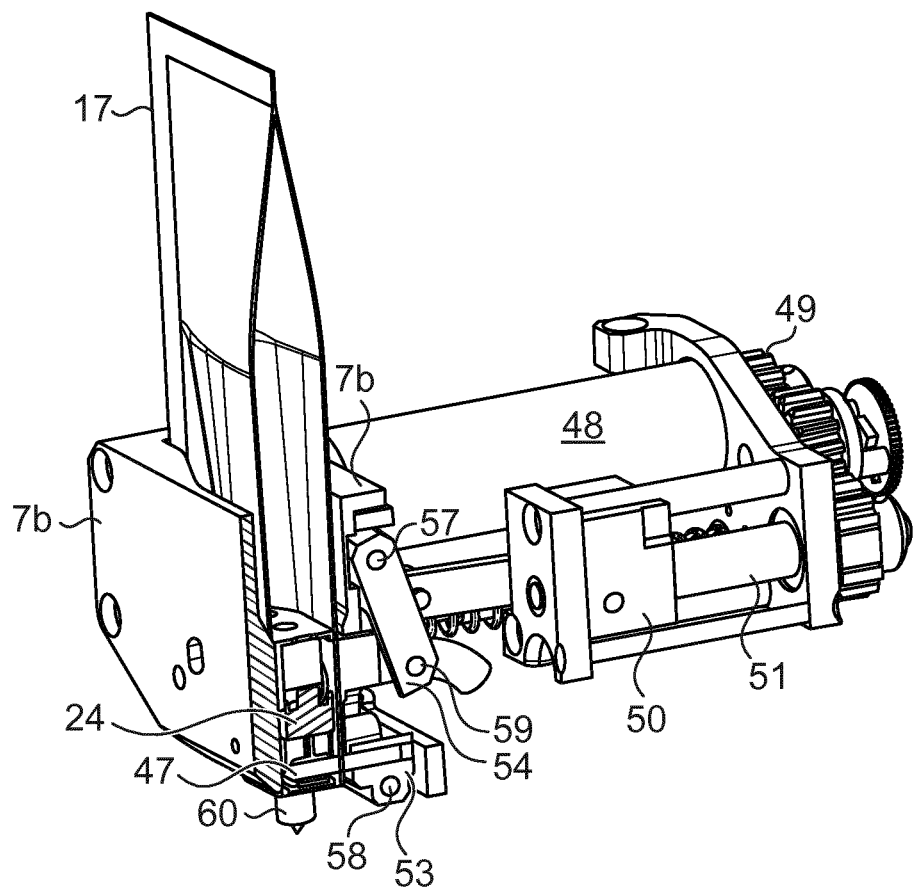
FIG. 6D is a perspective side view along E-E of FIG. 6A.

More precisely, the beverage preparation machine 1 is further provided with driving pins 47 each engaging with the guiding sockets 26 of the fitment assembly. The driving pins are mounted on a movable frame 48, as depicted in FIG. 6D, adapted to move the movable part 24 of the sachet 17 vertically upwards and downwards into respectively closed and open states to the sachet's spout.

In case the sachet's spout is enclosed (i.e. overwrapped) within the vicinity of the flexible film (according to one embodiment described above), the dispensing outlet of the sachet (as shown in FIG. 3C) advantageously comprises a sharpened part 240 on its lower side that is able to tear open the flexible film surrounding the spout 19 in this area, when the moveable part 24 vertically displaces with respect to the stationary part 23. This opening allows the beverage to eventually flow from the spout's dispensing opening towards a cup placed below.

In the exemplary embodiment described hereafter, the actuation of the different movements is performed automatically by using an electric motor 48, a gear mechanism 49 which drives a horizontally movable frame 50 along a horizontal shaft 51, as illustrated in FIG. 6A. The sachet 17 is inserted from above into a sachet holder 7b which has a funnel shape (as depicted in FIG. 6B) so as to stop the vertical displacement of the sachet inserted therein at a height wherein the centring sockets 25 of the sachet are aligned with the centring pins 45 of the interface 9b.

As illustrated in FIGS. 6B and 6C, the centring pins 45 and the fluid injection needle 46 are borne by a horizontally movable driving frame 52. The driving pins 47 are borne by a horizontally and vertically movable driving frame 53 which is engaged to the frame 52 in a vertically displaceable manner as shown in FIG. 6B, so that frame 53 moves horizontally together with frame 52, and is further able to move vertically relatively to frame 52. Driving frame 52 is attached to the upper arm 54 of a Y-shaped drive rocking member 55 through connecting pivot point 56. Driving frame 53 is attached to the lower arm 56 through lower connecting pivot point 58. Upper and lower arms are attached together to the horizontally displaceable driving frame 50, through a common pivot point 59.

In use, the soluble interface 9b has a first open position illustrated in FIG. 6B, wherein the movable frame 50 is located close to the motor 48 and gear mechanism 49. The guiding and driving pins 45 and 47, and the injection needle 46 are retracted away from the sachet holder 7b.

A sachet is inserted in the sachet 17 holder 7b, and the machine 1 is then actuated either manually, or by detection of a sachet identification code read by a sensor during insertion (sensor not represented in the drawing). Alternatively, if a code is present on the sachet, the code can be read even before insertion of the sachet in holder 7b, or after its complete insertion therein (the same alternatives are possible for the pod described herein before in relation to fluid delivery interface 9a).

Once a beverage preparation cycle is started, the motor 48 actuates the movement of the frame 50 through gear 49. The Y-shaped rocking member 55, and driving frames 52 and 53 are moved forward towards the sachet holder 7b and sachet 17 held therein, until the centring pins 45, the driving pins 47 and the water injection needle 46 are inserted respectively in the sachet's centring sockets 25, the guiding sockets 26 and the fluid injection socket of the sachet's spout 19, as illustrated in FIG. 6C.

As the sachet spout 19 is very well held in place by the centring pins 45, injection of fluid can start by circulating fluid (typically water) from the machine fluid system through the needle 46 into the sachet, where it is mixed with the ingredient, for instance a powder or a liquid concentrate.

Then, as frame 50 continues its movement along shaft 51, the Y-shaped rocking member is also moved forward until it reaches its foremost position close to (or in contact with) the sachet holder 7b. As frame 50 continues to move forward, the movement is then transmitted to the vertically movable driving frame 53. Precisely, the horizontal movement of common pivot point 59 transforms into a downward vertical movement of lower pivot point 58 which is driven farther away from upper pivot point 57. The driving frame 53, and the driving pins 47 attached thereto are moved downward vertically as illustrated in FIG. 6D with an arrow. Moving downward, the driving pins displace the movable part 24 of the sachet downwards too, which opens the dispensing outlet of the sachet 17. The beverage prepared therein flows out of the sachet through delivery spout 60 into a cup placed under the sachet (not shown).

Depending on the type of ingredient, the opening and closing position of the movable part 24 can be actuated at any time during preparation of a beverage, which allows to fill or empty the sachet more or less during mixing of the ingredient with water, according to pre-determined sequences that are programmed in the machine's control unit, or encoded into a code borne by the sachet and read before the sequence is started. For instance, water injection into the sachet can be started before or after the sachet is open. The sachet can be open from the beginning during the entire sequence, or it can be closed one or several times during mixing, in order to enhance the dissolution of powder in water. Temperature of water can vary or remain stable during the dissolution cycle. Injection pressure can also vary, in order to enhance or decrease foaming of the beverage thus obtained.

After the beverage preparation cycle is finished, the delivery interface 9b is moved back to its original position, and the used sachet is removed from the sachet holder.

Generally, the horizontal opening and closing stroke of the frame 50 is comprised between 7 and 20 mm, preferably between 10 and 12 mm, more preferably it is 11 mm. The vertical opening and closing stroke of the frame 53 is comprised between 5 and 15 mm, preferably it is 8 mm.

Interestingly, the control unit 8 of the machine is able to manage the functioning of the various fluid delivery interfaces 9a and 9b in a simultaneous, or sequential way, depending on the type of beverage that is to be prepared. The fact that each delivery interface comprises its own mechanical elements, and is independent from the other, allows to adapt to the type of kinematics that is necessary to prepare a beverage from each different type of container, typically a pod and a sachet, but using the same fluid system.

In the particular embodiment described above, excellent in-cup quality was achieved by extracting coffee at a high pressure from a relatively small volume container (a pod in the embodiment described therein) whose walls are held firmly by the container holder during use, to ensure that the coffee bed is maintained in a stationary state. Similarly, infusion or dissolution of powder ingredients provided excellent results in terms of in-cup quality, by mixing the ingredient with fluid at low pressure in a sachet presenting a plane shape oriented along a plane substantially vertical, and having a larger volume and flexible walls providing sufficient space for a proper mixing between the powder and the fluid. Similar advantages would be provided if powder is replaced with a liquid concentrate or a gel ingredient.

The machine according to the invention is particularly advantageous. In terms of sustainability, the package size is adapted to the amount of ingredient that is needed, and then the machine also adapts to the size of the one-use package.

In terms of mechanics, the closing force of each fluid delivery assembly (e.g. for the pods and for the sachets as described in more detailed above, but also for any other format of ingredient container) is adapted to the construction of the container, because the fluid pressure involved in both types of containers, and the fluid injection are completely different. More precisely, in the examples described above, the sachet is only held in place by two centering pins, which are sufficient that no fluid leakage occurs (the pressure inside the sachet is low, close to or equal to atmospheric pressure), while the coffee pod is fully enclosed in a closed brewing chamber that is sealed tightly (the water passing through the coffee bed is at a pressure up to 20 bar). Kinematics and mechanical elements dimensions for each individual fluid delivery assemblies of the machine are therefore also completely different and can be adapted to each type of ingredient and container independently, while using the same fluid system.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

The invention claimed is:

1. A beverage preparation machine comprising:
   a fluid system comprising a fluid source, a fluid pump, and a fluid heating element,
   two container holders comprising a first container holder and a second container holder, each container holder adapted for receiving a beverage ingredient container, and the first container holder is adapted to receive a first beverage ingredient container comprising a compacted roast and ground coffee pod, and the second container holder is adapted to receive a second beverage ingredient container comprising a soluble milk powder sachet,
   a control unit arranged for controlling the fluid system to prepare a beverage by mixing fluid with beverage ingredients contained in the beverage ingredient containers to produce a beverage component in each beverage ingredient container, and the control unit is further arranged to dispense at least a portion of the beverage components of the beverage ingredient containers at least simultaneously to produce the beverage; and separate fluid delivery interfaces, each separate fluid delivery interface arranged for independently delivering the fluid in each beverage ingredient container, each separate fluid delivery interface being connected to the fluid system and being adapted to each beverage ingredient container, wherein a fluid delivery interface of the compacted roast and ground coffee pod comprises a shower plate and is configured to distribute the fluid over at least a fluid-permeable portion of the compacted roast and ground coffee pod, and a fluid delivery interface of the soluble milk powder sachet comprises a fluid injection needle configured to pierce through a wall of the soluble milk powder sachet and protrude into the soluble milk powder sachet for injection of the fluid;

wherein the separate fluid delivery interfaces have different structural and kinematic configurations; and wherein the different kinematic configurations have different relative movements between the beverage ingredient container and the corresponding separate fluid delivery interface.

2. The beverage preparation machine according to claim 1, wherein the control unit is further arranged to dispense at least a portion of the beverage components of the beverage ingredient containers sequentially to produce the beverage.

3. The beverage preparation machine of claim 1, further comprising a selection valve configured to select delivery of fluid towards the separate fluid delivery interfaces, wherein the selection valve is connected to the control unit so that the control unit automatically switches a position of the valve to a closed state or to an open state for conducting hot or non-heated fluid towards one of the separate fluid interfaces or to both of the separate fluid interfaces at the same time.

4. The beverage preparation machine according to claim 1, wherein the control unit is arranged to control the fluid system for each of the separate fluid delivery interfaces in a different manner such that at least one of a fluid temperature, a fluid flow rate, a fluid pressure, or a fluid volume of the fluid that is delivered in the first beverage ingredient container differs from the fluid delivered in the second beverage ingredient container.

5. The beverage preparation machine according to claim 1, wherein the control unit is arranged to control the fluid system for each of the separate fluid delivery interfaces in a different manner such that at least one of a fluid flow rate, a fluid pressure, or a fluid volume of the fluid that is delivered in the first beverage ingredient container differs from the fluid delivered in the second beverage ingredient container.

6. The beverage preparation machine according to claim 1, wherein at least one of the separate fluid delivery interfaces is connected to the fluid system through a type of a releasable fluidic connection configured to be detached from the beverage preparation machine and replaced by another type of separate fluid delivery interface having the same type of releasable fluidic connection.

7. The beverage preparation machine according to claim 1, further comprising a fluid-cooling element.

8. The beverage preparation machine according to claim 1, wherein the separate fluid delivery interfaces differ by at least one structural element that involves at least one kinematic movement of rotation or translation.

9. The beverage preparation system according to claim 1, wherein
the soluble milk powder sachet comprises a pierceable, rupturable, or tearable film pouch sealed around at least one spout, the at least one spout comprising at least one fluid injection inlet and at least one beverage dispensing outlet.

10. The beverage preparation machine according to claim 1, wherein a headspace in at least one of the beverage ingredient containers is less than 20%.

11. The beverage preparation machine according to claim 1, wherein the fluid pump is configured to deliver fluid to the first beverage ingredient container or to the second beverage ingredient container at a pressure range between 5 bar and 20 bar.

12. The beverage preparation machine according to claim 1, wherein the fluid pump is configured to deliver fluid to the first beverage ingredient container or to the second beverage ingredient container at a flow rate between 150 ml/min and 650 ml/min.

13. The beverage preparation machine according to claim 1, wherein the fluid delivery interface of the compacted roast and ground coffee pod has a structural configuration comprising a stationary part and a cladding structure moveable relative to the stationary part.

14. The beverage preparation machine according to claim 1, wherein the fluid delivery interface of the soluble milk powder sachet has a structural configuration comprising a set of centering pins configured to move between a retracted position within the beverage preparation machine and a position inserted into an opening in the soluble milk powder sachet.

15. The beverage preparation machine according to claim 1, wherein the fluid injection needle is configured to move between a retracted position within the beverage preparation machine and a position piercing into a wall of the soluble milk powder sachet.

* * * * *